US009298472B2

(12) United States Patent
Kohiga

(10) Patent No.: US 9,298,472 B2
(45) Date of Patent: Mar. 29, 2016

(54) HIGH-SPEED RESTART METHOD, INFORMATION PROCESSING DEVICE, AND PROGRAM

(75) Inventor: Akihito Kohiga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1766 days.

(21) Appl. No.: 10/587,022

(22) PCT Filed: Jan. 27, 2005

(86) PCT No.: PCT/JP2005/001559
§ 371 (c)(1),
(2), (4) Date: Feb. 22, 2007

(87) PCT Pub. No.: WO2005/071522
PCT Pub. Date: Aug. 4, 2005

(65) Prior Publication Data
US 2007/0168724 A1    Jul. 19, 2007

(30) Foreign Application Priority Data

Jan. 27, 2004 (JP) ................................. 2004-018524

(51) Int. Cl.
G06F 15/177 (2006.01)
G06F 9/44 (2006.01)

(52) U.S. Cl.
CPC ................................... *G06F 9/4418* (2013.01)

(58) Field of Classification Search
CPC .................................................. G06F 9/4406
USPC .......................................................... 713/2
See application file for complete search history.

(56) References Cited

U.S. PATENT DOCUMENTS

| 5,825,649 A * | 10/1998 | Yoshimura ...................... 700/82 |
| 6,892,261 B2 * | 5/2005 | Ohno et al. .................... 710/260 |
| 6,901,298 B1 * | 5/2005 | Govindaraj et al. ............ 700/21 |
| 7,162,629 B2 * | 1/2007 | Zimmer et al. ............... 713/100 |
| RE40,092 E * | 2/2008 | Kang ................................. 713/2 |
| 7,356,677 B1 * | 4/2008 | Rafizadeh .......................... 713/1 |
| 7,373,496 B2 * | 5/2008 | Sekiguchi et al. ................ 713/2 |

FOREIGN PATENT DOCUMENTS

| JP | 5-27875 A | 2/1993 |
| JP | 10-232796 A | 9/1998 |
| JP | 11-24936 A | 1/1999 |
| JP | 11039143 A | 2/1999 |
| JP | 11-143764 A | 5/1999 |
| JP | 11-345129 A | 12/1999 |
| JP | 11345219 A | 12/1999 |
| JP | 2000-35919 A | 2/2000 |
| JP | 2002-82808 A | 3/2002 |
| JP | 2002-517034 A | 6/2002 |
| JP | 2002244885 A | 8/2002 |
| JP | 2002-259201 A | 9/2002 |

* cited by examiner

*Primary Examiner* — Kim Huynh
*Assistant Examiner* — Eric Chang
(74) *Attorney, Agent, or Firm* — Sughrue Mion, PLLC

(57) ABSTRACT

Process information saving unit 131 and process restoration unit 132 are provided. A process table 201 and other information required for restoring a process present in an OS 130 are copied in a save area 124 on a main memory area 120 during execution of an application. At the restart, only the OS is initialized while leaving the main memory area used by the application as it is. After the initialization, the saved process information (the process table and other information managed by the OS) is rewritten on the OS data area 12. By employing this configuration, provided is an environment allowing the process before the restart to be continuously operated after the restart.

37 Claims, 24 Drawing Sheets

HIGH-SPEED RESTART METHOD, INFORMATION PROCESSING DEVICE, AND PROGRAM

This application claims priority from PCT Application No. PCT/JP2005/001559 filed Jan. 27, 2005, and from Japanese Patent Application No. 2004-018524 filed Jan. 27, 2004, which applications are incorporated herein by reference.

TECHNICAL FIELD

The present invention relates to a rapid restart method suitably applicable to an application server, a general-purpose information processing apparatus and so on, and in particular relates to a rapid restart method, and an information processing apparatus and program which enable an application, which has been operated before restart, to be continuously operated after the restart.

BACKGROUND ART

Restart is used to reflect change in OS setting. When the OS is Windows (registered trademark), restart is required to change the registry contents and to reflect the change. Further, when it is difficult to identify the reason of a fault that has occurred in the system, restart is often employed as a measure to quickly restore the system. Thus, restart is used frequently during operation of the system, and hence there has been a demand to speed up the restart processing for minimizing the downtime of the system.

There is known, as an example of conventional techniques to realize the speed up of the restart processing, a rapid restart method for an information processing apparatus described in page 7 and FIG. 1 of Japanese Laid-Open Patent Publication No. H11-24936. FIG. 1 shows configuration of this conventional information processing apparatus. As shown FIG. 1, the conventional information processing apparatus 1 has a main memory device 11 arranged therein, and an input/output device 2 arranged externally. The main memory device 11 has, arranged therein, an OS program area 111 to load an operating system (hereafter, referred to as the "OS"), an initialization data area 112, non-initialization data area 113, and an initialization data save area 114. The information processing apparatus further has, in the interior thereof other than the main memory device 11, restart commencement unit 12, rapid restart designation unit 13, execution control unit 14, initialization data saving unit 15, initialization data restoration unit 16, input/output device halting unit 17, and OS loading unit 18.

In this conventional information processing apparatus 1, OS initialization data is saved into the initialization data save area 114 by the initialization data saving unit 15 at the startup of the OS. When rapid restart is designated by the rapid restart designation unit 13, the execution control unit 14 transfers execution to an execution start address of the OS program, and the initialization data restoration unit 16 restores initialization data. The rapid restart method provided by the prior art rapidly restarts the information processing apparatus by performing the foregoing processing, without reloading the OS program or data.

It is true that rapid restart of the OS can be realized by the conventional rapid restart method described in the above-mentioned patent publication, but this patent publication does not refer at all to an application program (hereinafter may be shortened to "application") which is executed on the OS. The application must be terminated normally or forcibly when restarting the OS. If the application is forcibly terminated to shorten the restart time, normal operation of the application after the restart cannot be guaranteed. This is because the current service state is not stored when the application is forcibly terminated. Some application requires, upon restart, the state of service when it was operated. In such case, normal operation of the application after the restart cannot be guaranteed. Therefore, the application must be terminated normally. However, the normal termination of the application involves frequent access to an auxiliary storage device with a low processing speed such as a disk, in order to store the current service state. Such frequent access to the auxiliary storage device increases the system termination processing time, which in turn increases the system restart time.

Additionally, the following cases are envisaged as matters to be considered when using restart. Restart is principally used to reflect the system settings to the OS, or when normal operation of the OS is inhibited due to a fault in the application. In a server which provides a service using a plurality of applications, the OS must be restarted if the normal operation of the OS is disabled due to a fault occurring in one of the plurality of applications. In this case, but only the failed application but also all other applications must be terminated, and an application which is midway through its service is obliged to forcibly interrupt the service.

In order to overcome the problems described above, it is an object of the present invention to provide a rapid restart method, and an information processing apparatus and program, capable of rapidly restarting the system by minimizing the processing to be performed at shutdown.

It is another object of the present invention to provide a rapid restart method, and an information processing apparatus and program, which enable continued operation of applications after restart.

DISCLOSURE OF THE INVENTION

Before describing unit for solving the problems above, key techniques of the present invention will be described for helping understanding of the invention.

A computer executes a program. The program in the computer is divided into execution units called processes and executed. The computer is able to execute only one process at a certain time point. In order to execute a plurality of processes simultaneously, a host program is required to manage these processes. This host program is an OS. The OS has process tables on the main memory area used by the OS itself, for managing the plurality of processes. One process table is prepared for each of the processes, and stores information for executing the process or information on the processing being executed. Accordingly, a process that is being executed can be interrupted and the interrupted process can be restarted from the state at the interruption by storing the process table and the main memory area used by the process. An application is formed by one or a plurality of processes. According to the present invention, a process table and other information required for restarting a process present in an OS during execution of an application are copied in a save area on a main memory area. At the restart, only the OS is initialized while leaving the main memory area used by the application as it is. After the initialization, the saved process information (the process table and other information managed by the OS) is rewritten on the OS data area. By employing this configuration, provided is an environment allowing the process before the restart to be continuously operated after the restart. More specifically, the present invention has configuration as described below.

A first rapid restart method of the present invention is characterized by: saving, before restart of an OS, process information in the OS relating to a user process to a save area on a main memory device; initializing, at the restart of the OS, the main memory area used by the OS while not restarting the main memory area used by the user process; and restoring the saved process information in the OS after the restart of the OS.

A second rapid restart method of the present invention is characterized by: saving, before restart of an OS, process information in the OS relating to a user process to a save area on a main memory device, while setting a restart flag for the saved process information to designate whether the process is to be restarted or not; initializing, at the restart of the OS, the main memory area used by the OS while not restarting the main memory area used by the user process for which the restart flag is set not to restart; and restoring the saved process information of the user process for which the restart flag is set not to restart in the OS, after the restart of the OS.

A third rapid restart method of the present invention is characterized by: saving, before restart of an OS, process information in the OS relating to a user process to be continuously operated after restart of the OS, to a save area on a main memory device; initializing, at the restart of the OS, the main memory area used by the OS while not restarting the main memory area used by the user process; and restoring the saved process information in the OS, after the restart of the OS. It is determined whether the user process is to be continuously operated or, in contrast, to be restarted after the restart or the OS, by referring to the process ID table storing identifiers of the processes to be continuously operated or the processes not to be continuously operated after the restart.

A fourth rapid restart method of the present invention is characterized by: saving, at generation of a user process, process information in the OS relating to the generated user process to a save area on a main memory device; setting, at switching of the user process, a restart flag for the saved process information to designate whether the process is to be restarted or not, while updating the process information saved in the save area to the latest state if the process is not to be restarted; nullifying the saved process information, at termination of the user process; initializing, at restart of an OS, the main memory area used by the OS while not restarting the main memory area used by the user process for which the restart flag is set not to restart; and restoring, after the restart of the OS, the saved process information of the user process for which the restart flag is set not to restart in the OS.

A fifth rapid restart method of the present invention is related to the second or fourth rapid restart method, and is characterized in that, when a restart flag is set for process information relating to a certain user process to designate whether the process is to be restarted or not, all the user processes belonging to the same user application program as the user process are searched, and restart flags in the process information relating to all the searched user processes are also set to the same value.

A sixth rapid restart method of the present invention is related to any of the first to fourth rapid restart method, and is characterized in that initialization of the main memory area used by the OS is performed by restoring a main memory image of the OS stored in a nonvolatile storage portion forming part of the main memory device.

A seventh rapid restart method of the present invention is related to the sixth rapid restart method, and characterized in that, every time occurs a write access from the OS to the nonvolatile storage portion during system operation, data in an address range having a predetermined width including the address at which the write access has occurred is copied from the nonvolatile storage portion to a substitute area ensured in a readable/writable main memory portion forming part of the main memory device, and subsequent accesses to the address range having the predetermined width are converted to accesses to the substitute area.

A first information processing apparatus of the present invention is characterized by comprising: process information saving unit for saving, before restart of an OS, process information relating to a user process to a save area on a main memory device; main memory initialization unit for initializing, at the restart of the OS, the main memory area used by the OS while not initializing the main memory area used by the user process; and process restoration unit for restoring, after the restart of the OS, the saved process information in the OS.

A second information processing apparatus of the present invention is characterized by comprising: process information saving unit for saving, before restart of an OS, process information in the OS relating to a user process to be continuously operated after restart of the OS, to a save area on a main memory device; main memory initialization unit for initializing, at the restart of the OS, the main memory area used by the OS while not restarting the main memory area used by the user process; and process restoration unit for restoring, after the restart of the OS, the saved process information of the user process for which the restart flag is set not to restart in the OS.

A third information processing apparatus of the present invention is characterized by comprising: process information saving unit for saving, before restart of an OS, process information in the OS relating to a user process to be continuously operated after restart of the OS, to a save area on a main memory device; main memory initialization unit for initializing, at the restart of the OS, the main memory area used by the OS while not restarting the main memory area used by the user process; and process restoration unit for restoring, after the restart of the OS, the saved process information in the OS. Before the restart of the OS, the process information saving unit saves process information in the OS relating to a user process to be continuously operated after restart of the OS in the save area on the main memory device, by referring to a process ID table storing identifiers of processes to be continuously operated or of processes not to be continuously operated.

A fourth information processing apparatus of the present invention is characterized by comprising: process save area generating unit for saving, at generation of a user process, process information in the OS relating to the generated user process to a save area on a main memory device; process save information updating unit for setting, at switching of the user process, a restart flag for the saved process information to designate whether the process is to be restarted or not, while updating the process information saved in the save area to the latest state if the process is not to be restarted; process information save area releasing unit for nullifying the saved process information, at termination of the user process; main memory initialization unit for initializing, at restart of an OS, the main memory area used by the OS while not restarting the main memory area used by the user process for which the restart flag is set not to restart; and process restoration unit for restoring, after the restart of the OS, the saved process information of the user process for which the restart flag is set not to restart in the OS.

A fifth information processing apparatus of the present invention is related to the second or fourth information processing apparatus, and is characterized by comprising unit for searching, when a restart flag is set for process information relating to a certain user process to designate whether the process is to be restarted or not, all the user processes belonging to the same user application program as the user process, and setting restart flags in the process information relating to all the searched user processes to the same value.

A sixth information processing apparatus of the present invention is related to any of the first to fourth information processing apparatuses above, and is characterized in that main memory initialization unit performs the initialization of the main memory area used by the OS, by rewriting the main memory image of the OS stored in a nonvolatile storage portion forming a part of the main memory device in the main memory area used by the OS.

A seventh information processing apparatus of the present invention is related to the sixth information processing apparatus, and characterized by comprising unit for copying, at every occurrence of a write access from the OS to the nonvolatile storage portion during system operation, data in an address range having a predetermined width including the address at which the write access has occurred from the nonvolatile storage portion to a substitute area ensured in a readable/writable main memory portion forming part of the main memory device, and for converting subsequent accesses to the address range having the predetermined width to accesses to the substitute area.

A first program of the present invention is characterized by causing a computer to function as: process information saving unit for saving, before restart of an OS, process information in the OS relating to a user process to a save area on a main memory device; main memory initialization unit for initializing, at the restart of the OS, the main memory area used by the OS while not initializing the main memory area used by the user process; and process restoration unit for restoring, after the restart of the OS, the saved process information in the OS.

A second program of the present invention is characterized by causing a computer to function as: process information saving unit for saving, before restart of an OS, process information relating to a user process to a save area on a main memory device; restart flag setting unit for setting a restart flag for the saved process information to designate whether the process is to be restarted or not; main memory initialization unit for initializing, at the restart of the OS, the main memory area used by the 0 while not initializing the main memory area used by the user process for which the restart flag is set not to restart; and process restoration unit for restoring, after the restart of the OS, the saved process information of the user process for which the restart flag is set not to restart in the OS.

A third program of the present invention is characterized by causing a computer to function as: process information saving unit for saving, before restart of an OS, process information in the OS relating to a user process to be continuously operated after restart of the OS, to a save area on a main memory device; main memory initialization unit for initializing, at the restart of the OS, the main memory area used by the OS while not restarting the main memory area used by the user process; and process restoration unit for restoring, after the restart of the OS, the saved process information in the OS. Before the restart of the OS, for example, the process information saving unit saves process information in the OS relating to a user process to be continuously operated after restart of the OS in the save area on the main memory device, by referring to a process ID table storing identifiers of processes to be continuously operated or of processes not to be continuously operated.

A fourth program of the present invention is characterized by causing a computer to function as: process save area generating unit for saving, at generation of a user process, process information in the 0 relating to the generated user process to a save area on a main memory device; process save information updating unit for setting, at switching of the user process, a restart flag for the saved process information to designate whether the process is to be restarted or not, while updating the process information saved in the save area to the latest state if the process is not to be restarted; process information save area releasing unit for nullifying the saved process information, at termination of the user process; main memory initialization unit for initializing, at restart of an OS, the main memory area used by the OS while not restarting the main memory area used by the user process for which the restart flag is set not to restart; and process restoration unit for restoring, after the restart of the OS, the saved process information of the user process for which the restart flag is set not to restart in the OS.

A fifth program of the present invention is related to the second or fourth program, and is characterized by causing the computer to further function as unit for searching, when a restart flag is set for process information relating to a certain user process to designate whether the process is to be restarted or not, all the user processes belonging to the same user application program as the user process, and setting restart flags in the process information relating to all the searched user processes to the same value.

A sixth program of the present invention is related to any of the first to fourth programs, and is characterized in that the main memory initialization unit performs initialization of the main memory area used by the OS by rewriting the main memory image of the OS stored in a nonvolatile storage portion forming a part of the main memory device in the main memory area used by the OS.

A seventh program of the present invention is related to the sixth program, and is characterized by causing the computer to further function as unit for copying, at every occurrence of a write access from the OS to the nonvolatile storage portion during system operation, data in an address range having a predetermined width including the address at which the write access has occurred from the nonvolatile storage portion to a substitute area ensured in a readable/Writable main memory portion forming part of the main memory device, and for converting subsequent accesses to the address range having the predetermined width to accesses to the substitute area.

The present invention further provides an OS restart method as follows. Specifically, provided is a method for restarting an OS in a computer in which a first OS memory area for loading an OS and a process memory area for loading processes are allocated on a main memory, and the OS and the processes are loaded in the respective areas, and the OS restart method is characterized by comprising a first step of acquiring process information, that is information for the OS to manage the processes, from the first OS memory area and storing the same in a save area provided in a predetermined storage device; a second step of initializing the first OS memory area while holding the process memory area; a third step of allocating a second OS memory area on the main memory and loading the OS therein; and a fourth step of updating the process information in the OS memory area according to the process information stored in the first step.

This OS restart method may further include the steps of: selecting a process to be held from the processes loaded in the process memory area; and initializing the process memory area allocated to the processes not selected.

In the OS restart method, the save area may be provided on the main memory.

In the OS restart method, information indicating whether each of the processes is to be restarted or not may be stored in the save area together with the process information of the relevant process.

In the OS restart method, information indicating whether each of the processes is to be restarted or not may be stored in a separate storage device from the storage device having the save area provided therein.

In the OS restart method, processing to generate, update and release the save area may be executed in accordance with the generation, switching and termination of a process on the storage device having the save area provided therein.

The OS restart method may be a method for preliminarily preparing a nonvolatile storage device storing an image of the OS when it is loaded in the main memory, the third step referring to the image stored in the nonvolatile storage device to load the OS in the main memory.

The OS restart method may further include the steps of: loading a process including a plurality of processes associated with one application program in the process memory area; selecting a process to be held from among the processes loaded in the process memory area; and initializing the process memory area allocated to the processes other than the selected process and the other processes associated with the same application program as the selected process.

BEST MODE FOR CARRYING OUT THE INVENTION

A first embodiment of the present invention will be described in detail with reference to the drawings.

Figure 1:
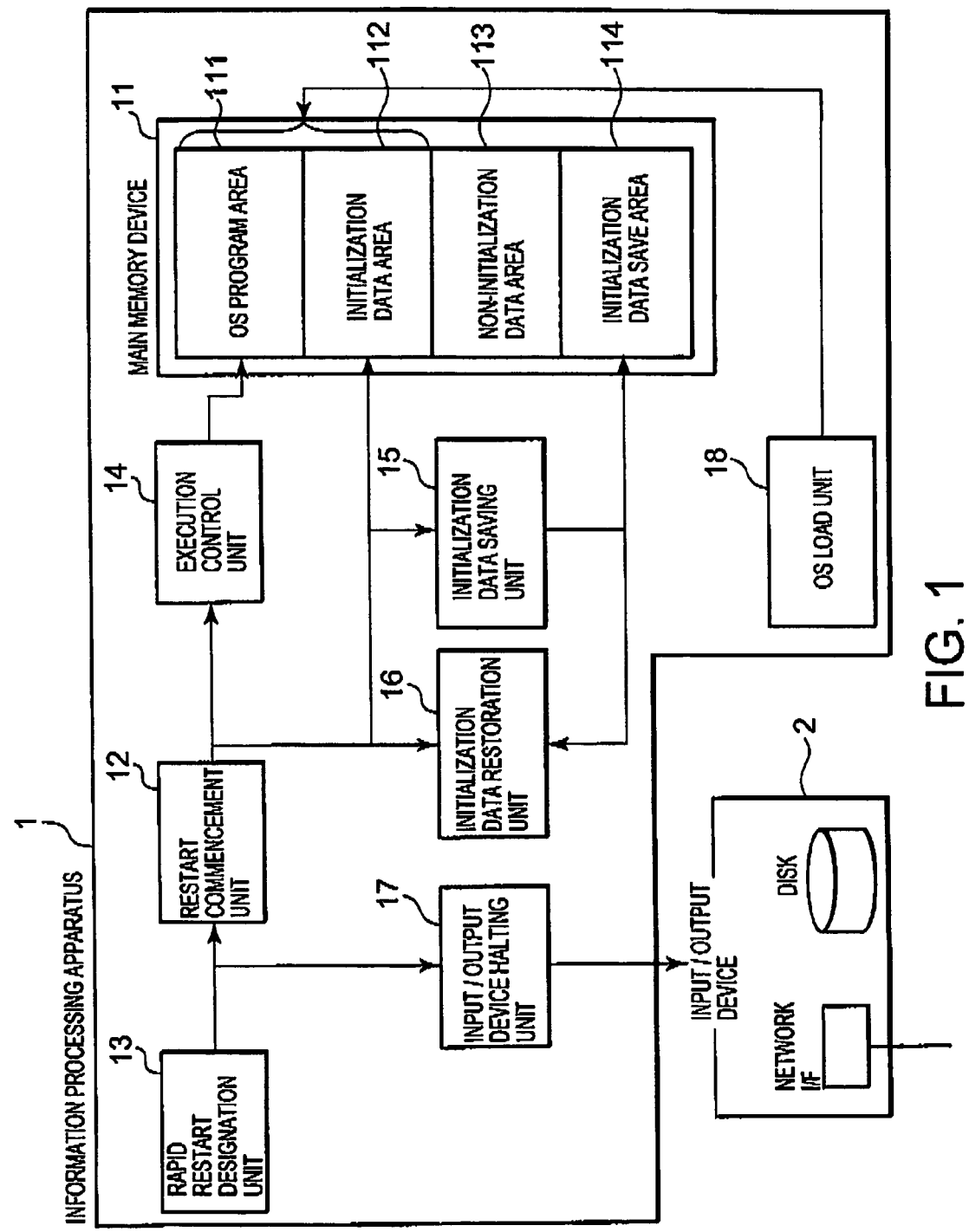
FIG. 1 is a block diagram showing configuration of a conventional information processing apparatus.
Figure 2:
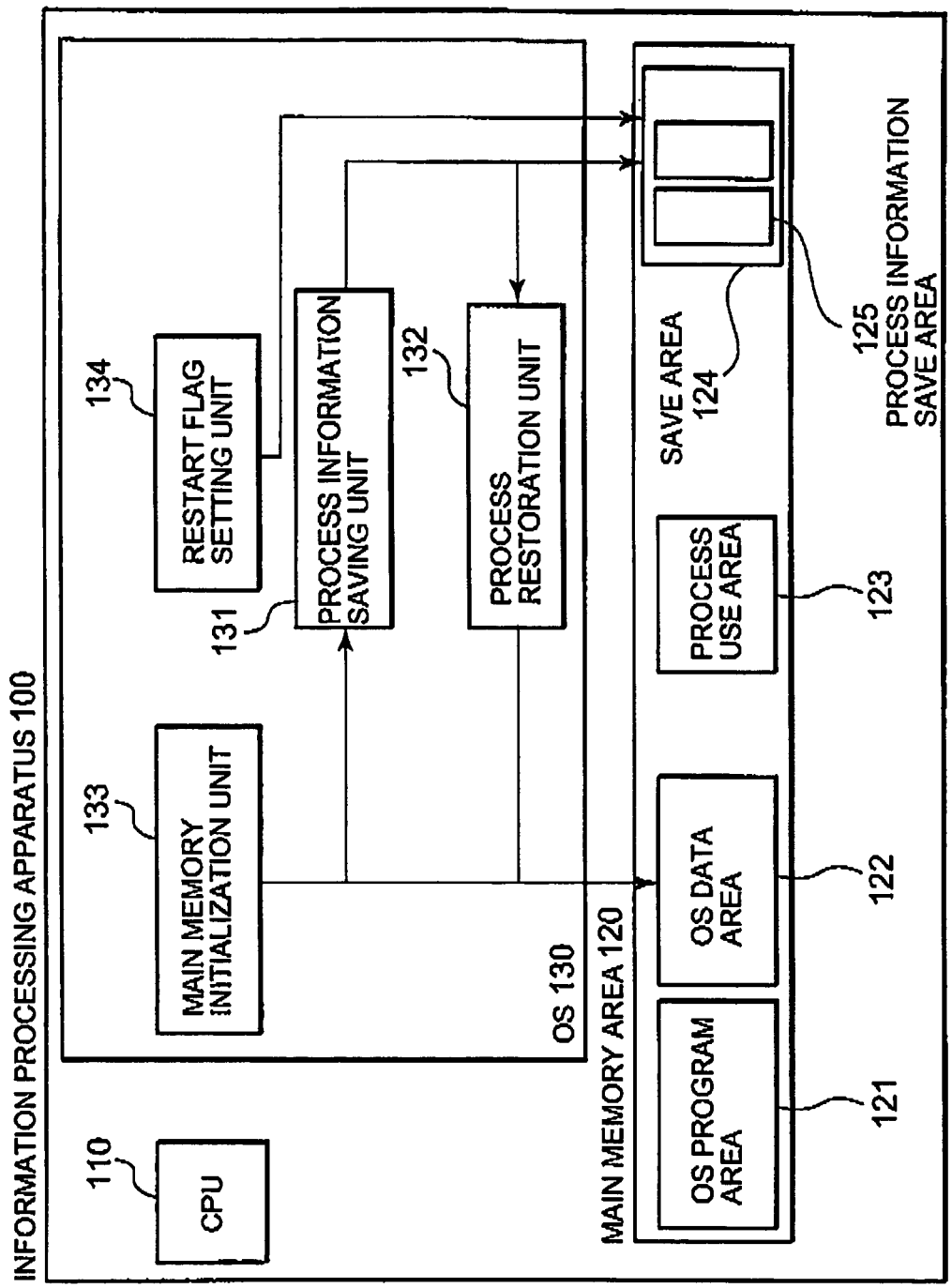
FIG. 2 is a block diagram showing configuration of an information processing apparatus according to a first embodiment of the present invention.

Referring to FIG. 2, an information processing apparatus 100 according to the first embodiment of the present invention is composed of a CPU (processor) 110 operating under program control, a main memory area 120, and an OS 130. A process is executed by the CPU 110. The main memory area 120 includes an OS program area 121, an OS data area 122, a process use area 123, and a save area 124. The save area 124 includes the same number of process information save areas 125 as the number of processes being executed. The OS 130 includes process information saving unit 131, process restoration unit 132, main memory initialization unit 133, and restart flag setting unit 134.

Figure 3:
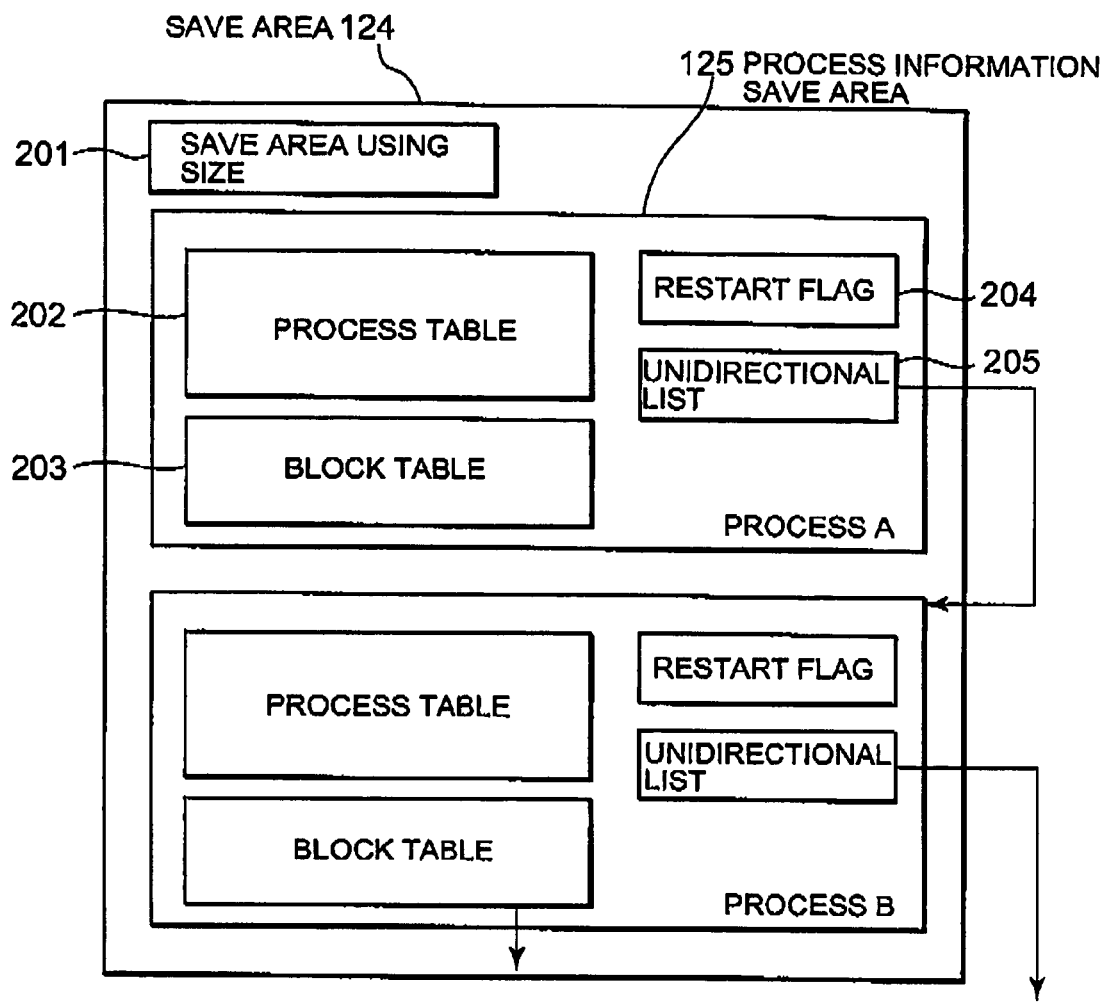
FIG. 3 is a diagram showing data structure of a save area according to the first embodiment of the present invention.

FIG. 3 shows data structure in the save area 124. The save area 124 includes individual areas called process information save areas 125 for saving information managed by the OS for the respective processes. The process information save areas 125 are connected by a unidirectional list 205. The save area 124 further includes a data area called save area using size 201 indicating the size of the save area 124. The information managed by the OS consists of a process table 202 and a block table 203. The OS creates and holds one process table for each process. The process table contains every type of information on the process such as process condition, program counter, stack pointer, memory assignment, opened file condition, and schedule information. The OS manages the main memory area 120 in units called blocks. One block table 203 exists for each of the individual processes, and addresses of the blocks used by the corresponding process are described therein. A restart flag 204 is a flag for determining whether or not the process is to be restarted. Although the restart flag 204 is provided independently from the process table 202 in this embodiment, a restart flag may be incorporated in the process table 202.

The save area 124 basically starts at the end address in the main memory area 120 and extends toward the top of the main memory area 120 to occupy spaces in the main memory area 120 corresponding to the number of processes currently being executed. The addressing method to the save area 124 from a fixed position at the rear has advantages as described below. The OS initializes the main memory area in order to manage the main memory area at startup. According to the present invention, the OS must know, at the initialization of the main memory area, the save area 124 that has been used before the restart and the process use area 123 that has been used by the process itself to execute the program. In order to know, after the startup, the process use area 123 that has been used by the process before the restart, the save area 124 can be placed to start from the fixed position. In this manner, the OS is saved from the necessity of finding the location of the save area 124 after the startup. The OS is enabled to know where the process information save area 125 is only by describing, as part of the OS program, that "the process information save area 125 is placed to start from the end address of the main memory area 120", and thus to know the process use area 123 from the process information save area 125 in the save area 124. Accordingly, as long as the position of the save area 124 before the restart can be known, the position of the save area 124 on the main memory area 120 need not necessarily be at the rearmost thereof. Further, the save area 124 may be stored in a separate storage device (a nonvolatile main memory device such as flash memory).

The process information saving unit 131, the process restoration unit 132, the main memory initialization unit 133, and the restart flag setting unit 134 have functions as described below, respectively.

The process information saving unit 131 saves a process table and a block table within the OS to the process information save area 125.

The saving processing of a process table means processing to copy the process table for a process from the OS data area 122 to the process information save area 125.

The OS typically manages the main memory area 120 while dividing the same into a plurality of blocks, and executes a process by giving a required amount of blocks to the process. Information on which block the process is using is stored in the block table. The saving processing of a block table means a processing to copy the block table 203 associated with the process from the OS data area 122 to the save area 124.

The restart flag setting unit 134 sets a restart flag 204 provided in a certain process information save area 125 in response to an entry by a user. The entry by the user is a process ID for specifying a process. A process having a restart flag 204 set is restarted, and the restarted process is not restored to the state before the restart. Consequently, the process information save area 125 and the process use area 123 of this process are released. In contrast, a process not having a restart flag 204 set is not restarted, and is restored to the state before the restart, using the process information save area 125 and the process use area 123 of this process.

The main memory initialization unit 133 is processing to recognize the area used by the process executed by the OS before the startup. In general, the OS performs initialization processing for each block in order to recognize the main memory area 120 that can be used at startup. The block used by the process that has been executed before the startup is retrieved from the block table 203 in the process information save area 125, so that the initialization processing is not conducted on the block used by the process.

The process restoration unit 132 is processing to restore a process from the process table 202 and the block table 203 stored in the process information save area 125. The restoration processing means processing to write back (copy) the process table 202 and the block table 203 to the OS data area 122.

The overall operation of this embodiment will be described in detail with reference to FIGS. 2 to 6.

Figure 4A:
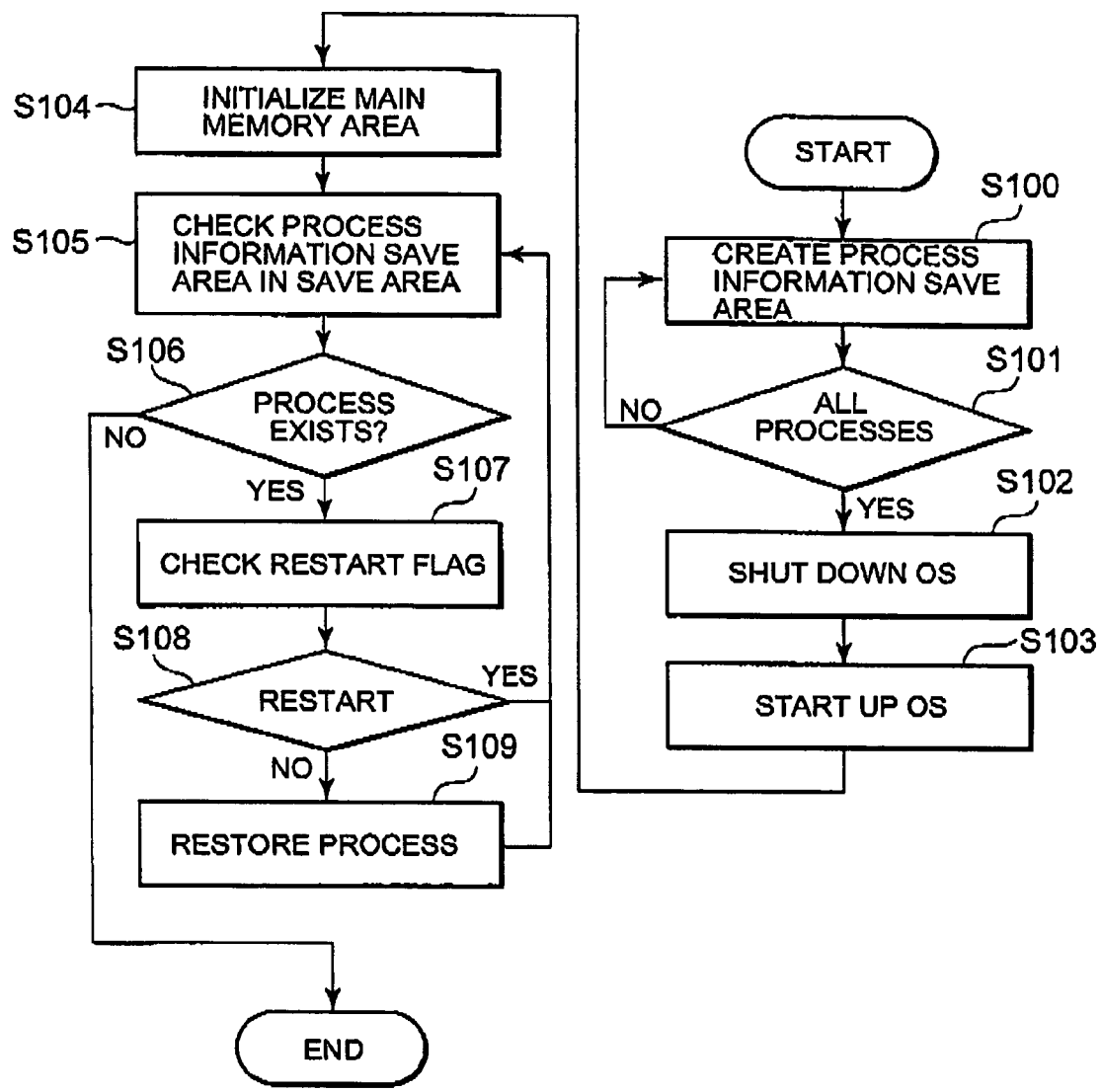
FIGS. 4A and 4B are flowcharts showing operation of the first embodiment of the present invention.

Firstly, a description will be made on the processing up to the shutdown of the system. In the first place, process information save areas 125 are created for all the processes by means of the process information saving unit 131 (FIG. 4A, S100). This processing is performed for all the processes and ends when the process information save areas 125 have been created for all of the processes (S101).

The creation of each process information save area 125 is performed by the following steps of: securing the process information save area 125 on the main memory; reading a process table 202 for the relevant process from the OS data area 122 to copy the same to the secured process information save area 125; and then reading a block table 203 from the OS data area 122 to copy the same to the secured process information save area 125. Upon the creation of the process information save area 125, the size of the main memory area used for the process is added to the save area using size 201. Additionally, a restart flag 204 is set, if necessary, and the process information save areas 125 are connected by the unidirectional list 205.

Normal shutdown processing is performed for the OS after the process information save area 125 has been created for every process (S102). The process is not subjected to termination processing but left as it is until the process is restored after the startup of the OS. The creation of the process information save area 125 is started directly before the system shutdown, that is, upon an issuance of system shutdown command by the user, and is finished before commencement of the OS shutdown processing. However, the process information save area 125 may be created at any time.

The setting of the restart flag 204 is performed by the restart flag setting unit 134 at any time before the system shutdown. The restart flag 204 is located in the process information save area 125. Since the restart flag 204 cannot be set before creation of the save area for the relevant process, the OS is required to temporarily store restart flag setting information for the process if the OS is instructed by the user to restart before the creation of the save area for the process. In this case, the setting information is stored as a process ID list in the restart flag setting unit 134. Once the process information save area 125 has been created, the restart flag 204 is set according to the previous instruction from the user.

A description will now be made on processing at startup. The OS startup processing including deployment of the OS (S103) is similar to that of other OSs, such as Linux. The deployment of Linux is described, for example, in "D. Bovet and M. Cesati, Understanding the Linux Kernel, O'Reilly Japan, 2001". The following description on the processing at startup will be started from the time point when the OS deployment onto the main memory is finished and the OS is about to start the initial processing.

Figure 5:
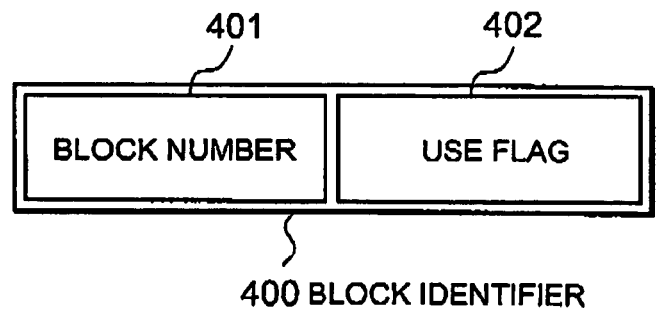
FIG. 5 is a diagram illustrating a block identifier according to the first embodiment of the present invention.

Firstly, the OS initializes the main memory in units of blocks in order to recognize an available area in the main memory area 120 (S104). When performing the initialization, the OS is required to recognize the area used by the process before the restart. The OS has a block identifier 400 for recognizing whether a certain block is being used or not (FIG. 5). The block identifier 400 is composed of a block number 401 and a use flag 402. One block identifier 400 exists for each of the blocks. At startup, an area for the block identifier 400 is secured in the OS data area 122, and the use flag 402 is set to zero (not used), whereby it is considered that the main memory area 120 has been initialized. The start address of the available main memory area is previously assigned with a value by BIOS or the like.

Figure 6:
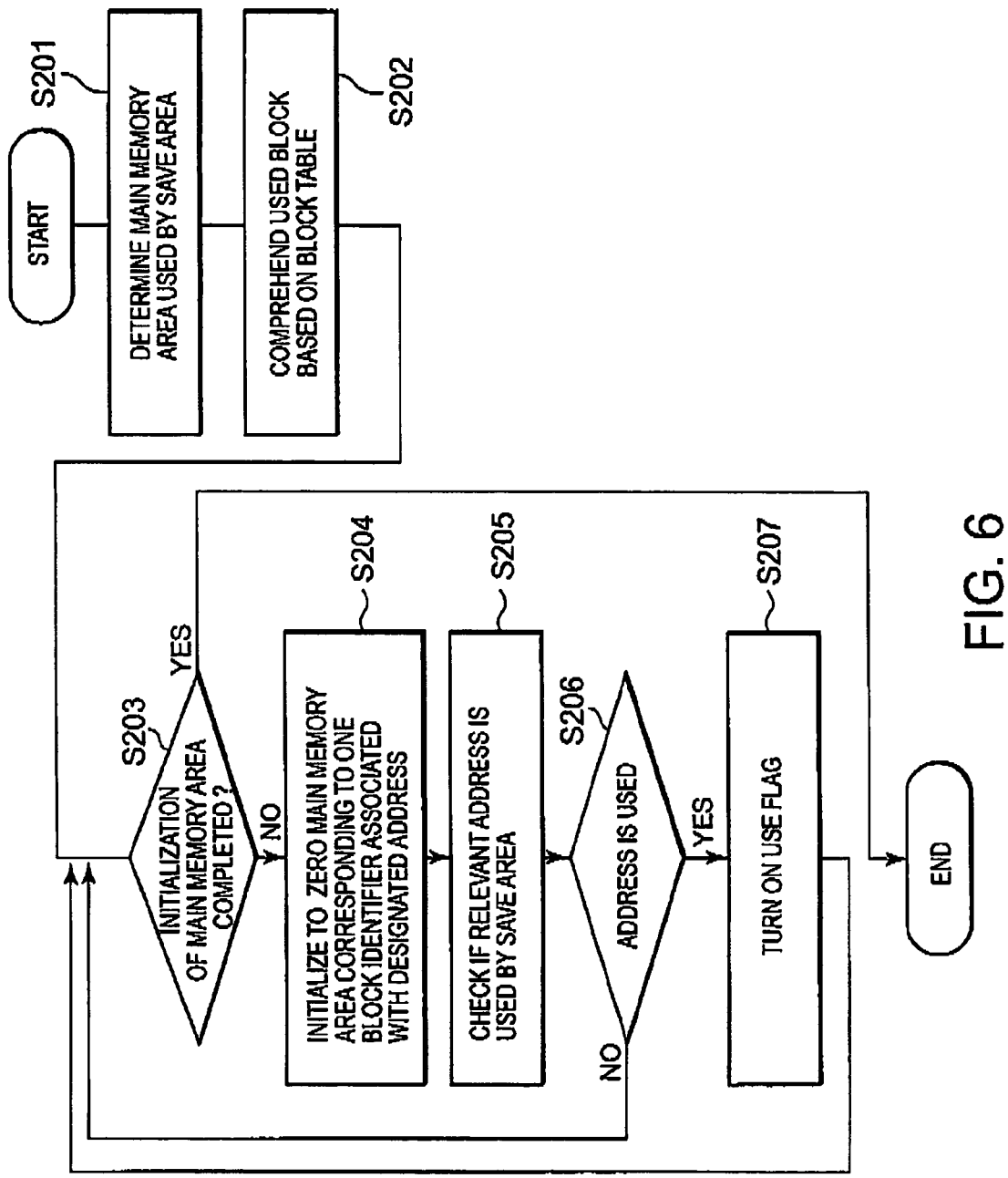
FIG. 6 is a flowchart illustrating processing by main memory initialization unit according to the first embodiment of the present invention.

FIG. 6 is a flowchart illustrating the main memory initialization unit 133 according to the present invention. Any area used by the save area 124 is preliminarily checked before executing the main memory initialization unit 133 according to the present invention (S201). The area used by save area 124 can be determined by reading the save area using size 201 in the save area 124. Subsequently, all the process information save areas 125 in the save area 124 are searched to preliminarily comprehend the blocks not requiring initialization based on the block table 203 for the process having no restart flag 204 set (the process before the restart is continuously used) (S202). A list of block numbers 401 of the blocks being used by the save area 124 is temporarily stored for use in future.

After checking the save area using size 201 and comprehending the blocks not requiring initialization, a part of the main memory area corresponding to one block identifier associated with the designated address is initialized to zero (S204). It is then checked whether or not the block previously initialized is used by the save area 124 (S205). If used (YES in S206), the block is marked with a use flag (S207), and the next address is checked. Once all the block identifiers 400 of the available area have been initialized (YES in S203), the main memory initialization unit 133 terminates.

Having finished the initialization of the main memory area 120, the process is then restored. The process information save area 125 in the save area 124 is checked to determine whether the restart flag 204 is set (S107). If restart is to be performed (S108), the save area 124 for the relevant process information is released and processing is conducted on the save information for the subsequent process (S105). If restart is not performed, the process is restored (S109). The foregoing processing is performed until there become no entries on the process information save areas 125 in the save area 124 (S106). The restoration of the process is performed by securing an area for a process table and a block table on the OS data area 122 (S110, S112), and copying the process table 202 and the block table 203 which have been saved to the area thus secured (S111, S113). The following processing is performed when releasing the save area 124 for certain process information.

1) The pointer to the subsequent process information save area indicated by the unidirectional list 205 of the process information save area directly before the one to be deleted (the previous list component in the unidirectional list 205) is replaced with the content in the unidirectional list 205 stored in the process information save area to be deleted.

2) The use flag 402 in the block identifier 400 of the main memory block used by the process information save area to be deleted is set to zero (not in use).

3) A value corresponding to the process information save area to be deleted is subtracted from the value of the save area using size 201.

A description will now be made on the advantages of this embodiment.

According to this embodiment, the process (application) termination processing can be omitted to eliminate the input/output processing from/to a device with a low transfer speed, such as an auxiliary storage device, involved by the termination of the process. Consequently, the system restart time can be shortened.

In addition, an arbitrary process can be continuously executed, even after restart thereof, while holding its condition before the restart. This eliminates the need of forcibly interrupting the service provided by the process upon restarting the system.

A modification of the first embodiment of the present invention will be described with reference to the drawings.

Figure 7:
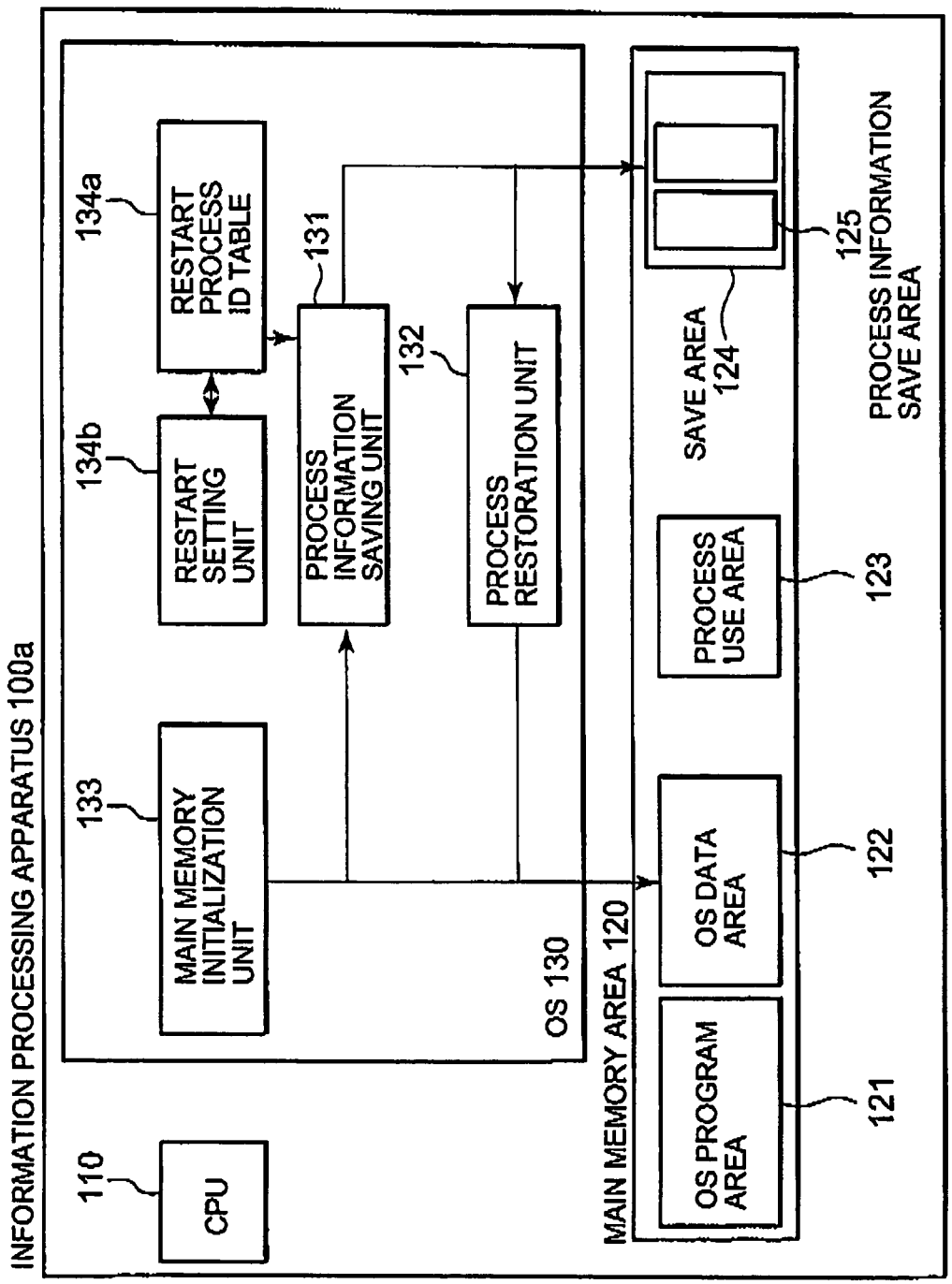
FIG. 7 is a block diagram illustrating configuration of a modification of the first embodiment of the present invention.

Referring to FIG. 7, a information processing apparatus 100a according to the modification of the first embodiment of the present invention is different from the information processing apparatus 100 according to the first embodiment of the present invention shown in FIG. 2 in that a restart process ID table 134a and restart setting unit 134b are provided in place of the restart flag setting unit 134.

According to the first embodiment of the present invention, any process information relating to a user process in the OS is saved in the save area on the main memory device before restarting the OS, while a restart flag 204 is set for the saved process information to designate whether or not the process is to be restarted. At restart of the OS, the main memory area used by the OS is initialized while not initializing the main memory area used by the user process having the restart flag 204 set to not restart. After the restart of the OS, the process information of the user process having the restart flag 204 set to not restart, among the saved process information, is restored in the OS.

Figure 8:
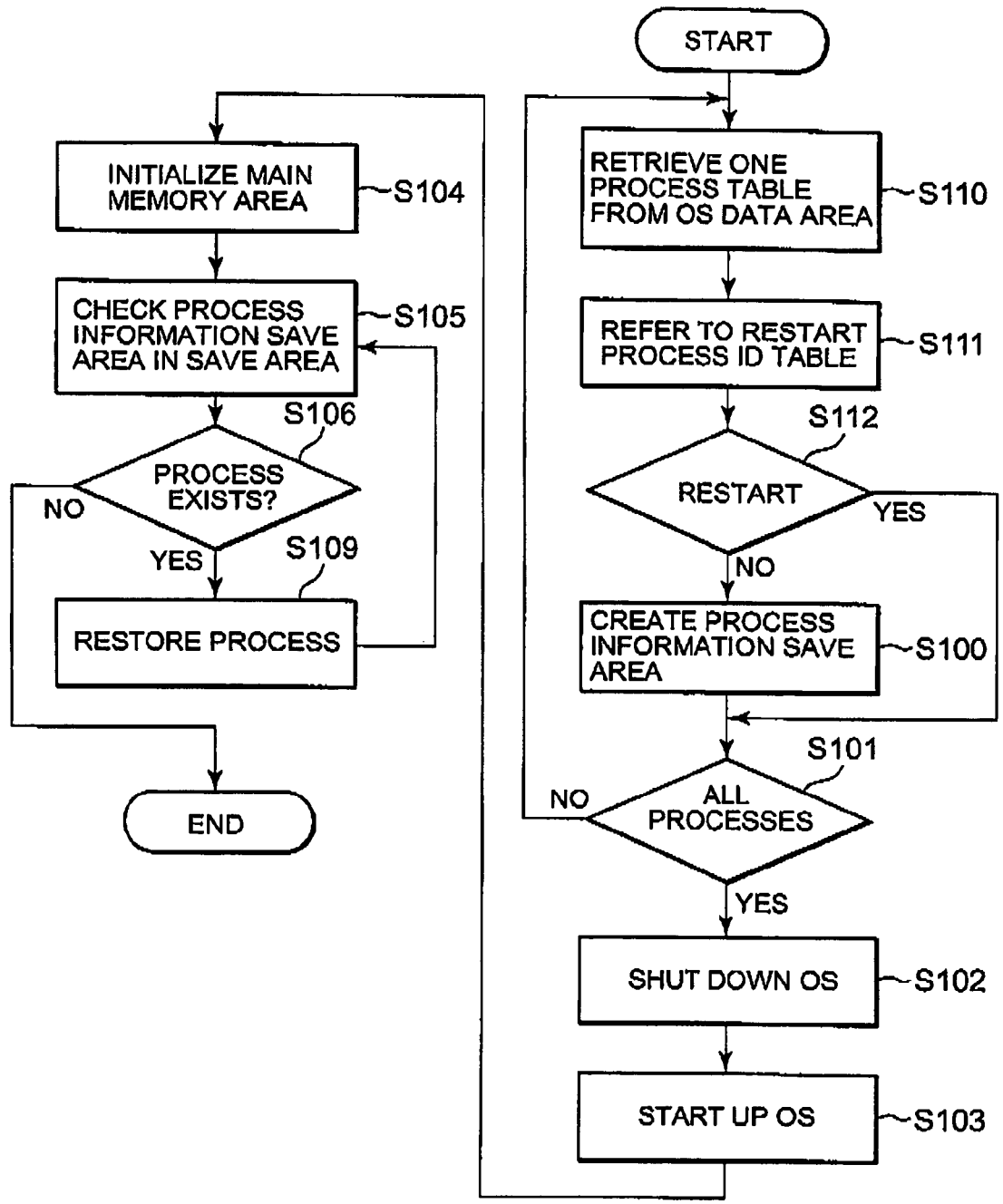
FIG. 8 is a flowchart illustrating operation of the modification of the first embodiment of the present invention.

In contrast, according to the modification of the first embodiment, the restart process ID table 134a is provided for holding an ID of a user process to be restarted, and the restart setting unit 134b sets the ID of the user process to be restarted in the process ID table 134a, based on the process ID entered by the user, at least before the shutdown of the OS. As shown in the flowchart of FIG. 8, the process information saving unit 131 retrieves one process table from the OS data area 122 before the restart of the OS (S110), and checks whether or not the process ID set in the process table is registered in the restart process ID table 134a (S111). Based on the checking result, the process information saving unit 131 determines whether the user process corresponding to the process table is a process to be restarted or a user process to be continuously operated after the restart of the OS (S112), and saves the process information in the OS relating to the user process that is not restarted but continuously operated, into the save area 124 on the main memory device (S100). Specifically, a process information save area 125 as shown in FIG. 3 is created. According to this modification, however, the restart flag 204 may be omitted. At the restart of the OS (S102, S103), the main memory area used by the OS is initialized by the memory initialization unit 133 while not initializing the main memory area used by the saved user process (S104), and the saved process information is restored in the OS (S105, S106, S109).

In the foregoing description, the process ID of the user process to be restarted is set in the restart process ID table 34a. Conversely, a process ID of a user process that is not restarted but continuously operated may be set.

In the first embodiment, the process information save area 125 is created also for a process requiring restart. According to this modification, however, the process information save area 125 is created only for a process not requiring restart. Therefore, it is possible to reduce the number of times to create the process information save areas 125 compared to the first embodiment.

A second embodiment of the present invention will now be described in detail with reference to the drawings.

Figure 9:
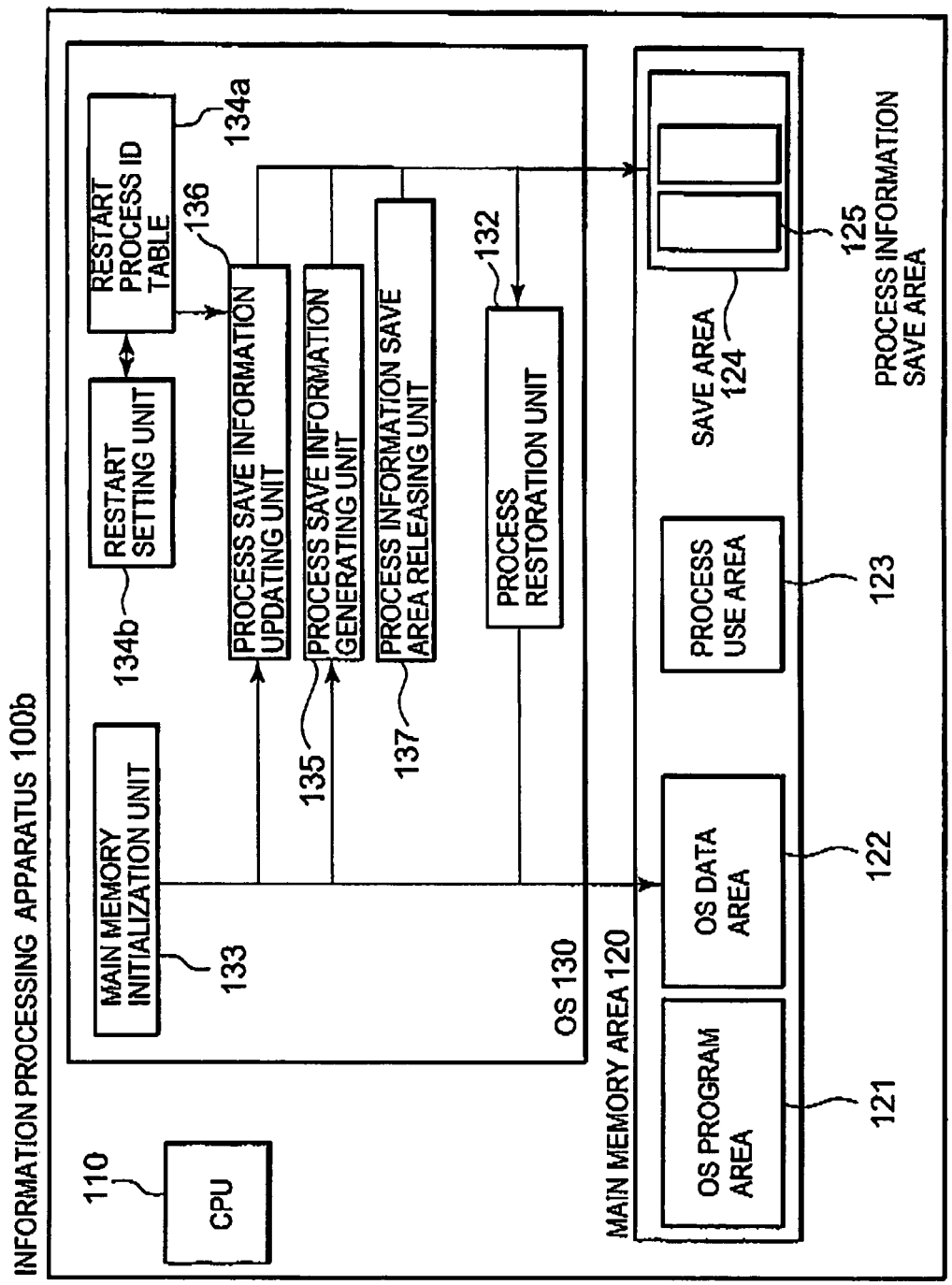
FIG. 9 is a block diagram illustrating configuration of an information processing apparatus according to a second embodiment of the present invention.

Referring to FIG. 9, an information processing apparatus 100b according to the second embodiment of the present invention is different from the first embodiment of the present invention shown in FIG. 2 in that a restart process ID table 134a and restart setting unit 134b are provided in place of the restart flag setting unit 134, and process save information generating unit 135, process save information updating unit 136 and process information save area releasing unit 137 are provided in place of the process information saving unit 131. The restart process ID table 134a and the restart setting unit 34b are similar to those of the above-described modification of the first embodiment of the present invention. Specifically, the restart setting unit 134b sets an ID of a user process to be restarted in the restart process ID table 134a based on the process ID entered by the user.

According to this second embodiment, the process information saving unit 131 in the first embodiment of the present invention is divided into three units. In the first embodiment, process save information is created at any time, using the process information saving unit 131. In the second embodiment, however, a process information save area is created, updated, and released at the time of creating a process, switching the process, and terminating the process, respectively. These three types of processing are respectively executed by process save information generating unit 135, process save information updating unit 136, and process information save area releasing unit 137. The "process switching" means processing as described below. A multitask OS such as UNIX (registered trademark) simultaneously executes a plurality of processes, but the CPU is only able to execute one process in minute time Δt. Accordingly, the multitask OS switches the execution of the process at regular time intervals in order to pretend as if it is executing a plurality of processes simultaneously. This processing is referred to as the process switching. A description will now be made on the creation, updating and releasing of the process information save area.

Figure 10:
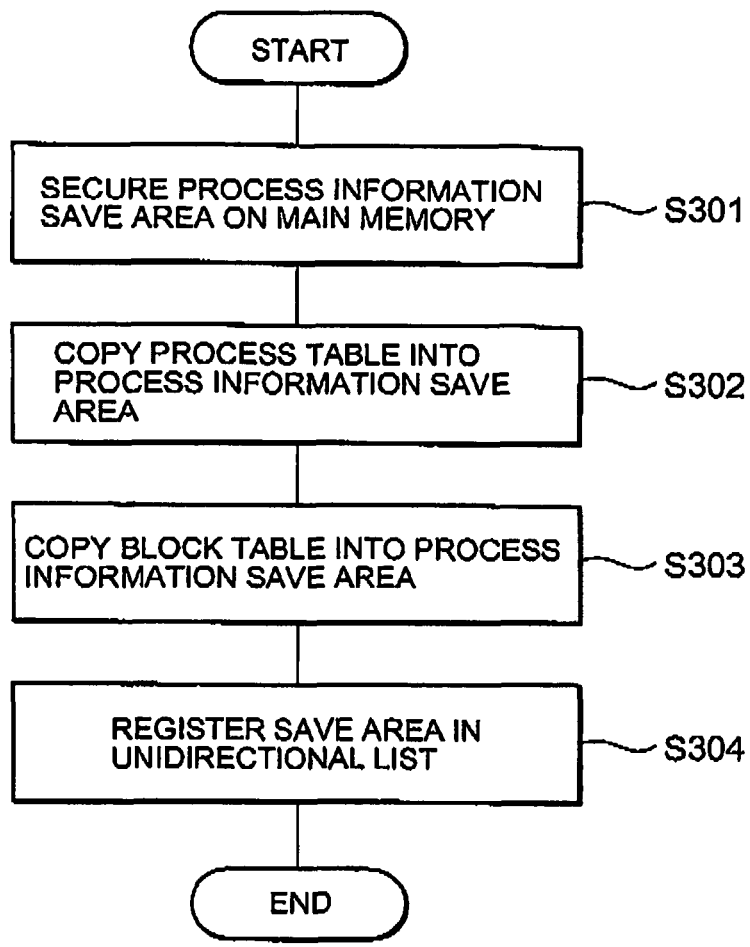
FIG. 10 is a flowchart illustrating processing by process save information generating unit according to the second embodiment of the present invention.

FIG. 10 is a flowchart illustrating the process save information generating unit 135 operating during creation of a process. The process save information generating unit 135 starts processing at the completion of creation of the process by the OS. The "completion of creation of the process" means the time when the preparation to execute a process to create has been completed by preparing a process table 202 for the process to create in the OS data area 122, assigning a process use area 123 to the process, and copying a program to execute in the using area 123. In the first step, a process information save area 125 is secured on the main memory area 120 (S301 in FIG. 10). In the next step, a process table 202 for the relevant process is copied from the OS data area 122 to the process information save area 125 (S302). Subsequently, a block table 203 for the relevant process is copied from the OS data area 122 to the process information save area 125 (S303).

Finally, a unidirectional list 205 is established and the save area 124 is registered in the list (S304).

Figure 11:
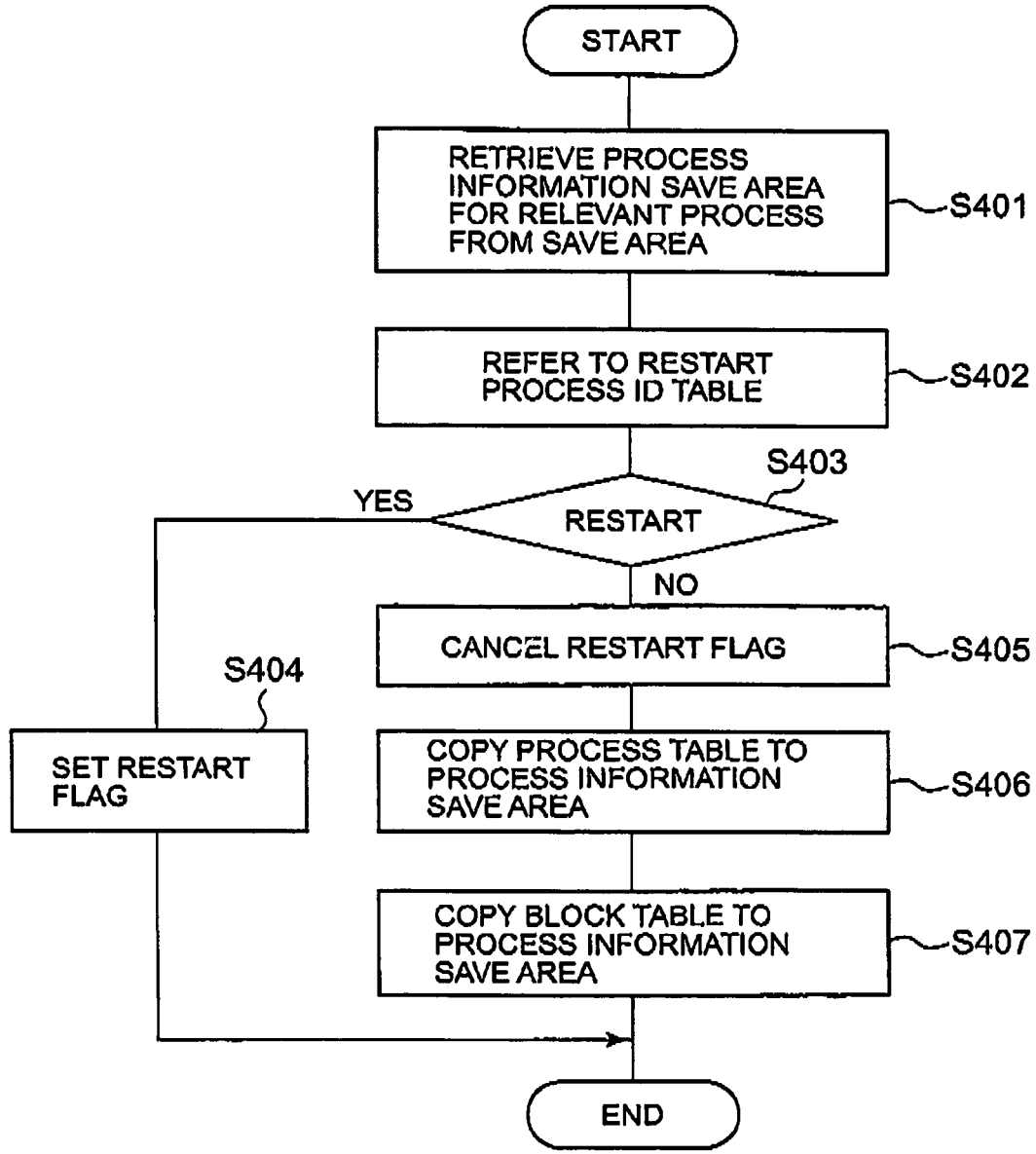
FIG. 11 is a flowchart illustrating processing by process save information updating unit according to the second embodiment of the present invention.

FIG. 11 is a flowchart illustrating the process save information updating unit 136 operating during the process switching. In the first step, a process information save area 125 for the relevant process is retrieved from the save area 124 (S401). Next, it is checked whether the user has instructed to restart the process by referring to the restart process ID table 134a (S402). If the user has instructed to restart (S403), a restart flag 204 is set in the retrieved process information save area 125 (S404), and the process save information updating unit 136 is terminated. If the process is not to be restarted but continuously operated (S403), the restart flag 204 is cancelled (S405). The latest process table 202 on the OS data area 122 is copied to the process information save area 125 (S406), the latest block table 203 on the OS data area 122 is copied to the process information save area 125 (S407), and the process save information updating unit 136 is terminated. If there is no instruction from the user, processing is performed according to the restart flag. If there is a restart flag 204 set, the processing terminates without performing the update processing (S406, S407).

Figure 12:
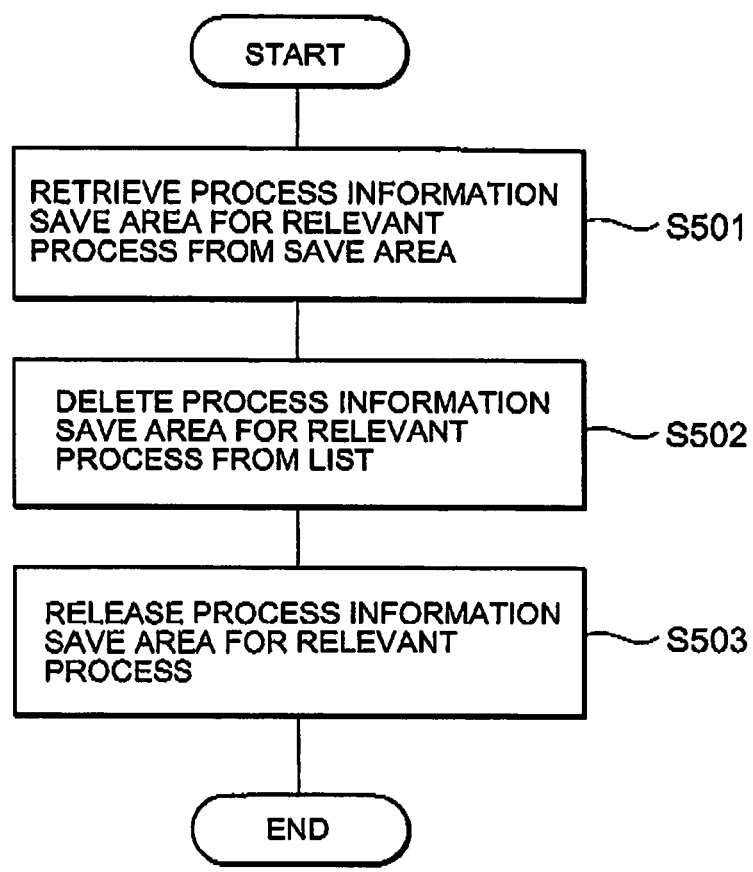
FIG. 12 is a flowchart illustrating processing by process information save area releasing unit according to the second embodiment of the present invention.

FIG. 12 is a flowchart illustrating the process information save area releasing unit 137 operating during the process termination. In the first step, a process information save area 125 for the relevant process is retrieved from the save area 124 (S501). Next, the process information save area 125 for the relevant process is deleted from the unidirectional list 205 (S502). This processing (S502) serves as processing to connect the lists of previous and following areas of the process information save area for the relevant process. In the next step, the information save area 125 for the relevant process is released (S503). Specifically, the use flag 402 in the block identifier 400 of the main memory block used by the process information save area 125 to be deleted is set to zero (not in use), and a value corresponding to the process information save area to be deleted is subtracted from the value of the save area using size 201. The processing by the process information save area releasing unit 137 terminates here, and the process termination processing by the OS is commenced.

The main memory initialization, the process restoration and the like after the restart are the same as those in the first embodiment.

The second embodiment has advantages as described below.

In the first embodiment, it is necessary to create a process information save area 125 at the system shutdown in order to hold the latest process information. For example, if the process information save area 125 is created for the process ten minutes before the system shutdown, there is a possibility of the process having executing the processing, in these ten minutes from the creation of the process information save area 125 to the system shutdown, to rewrite the process table, to release any unnecessary block, and to rewrite the block table. If this happens, the process possibly cannot be executed even if the process table 202 and the block table 203 are restored by the process restoration unit 132. Therefore, a process information save area 125 must be created at the system shutdown in order to hold the latest process information. Applying the second embodiment, in contrast, the process information can always be kept in the latest condition, and the need of performing process termination processing at the system shutdown is eliminated completely. Thus, the system can be shut down more rapidly in comparison with the first embodiment.

Next, a third embodiment of the present invention will be described with reference to the drawings. Before starting the description, a description will be made on a rapid restart method employing a main memory image used in this third embodiment (hereafter, referred to as the "main memory image method").

Figure 13:
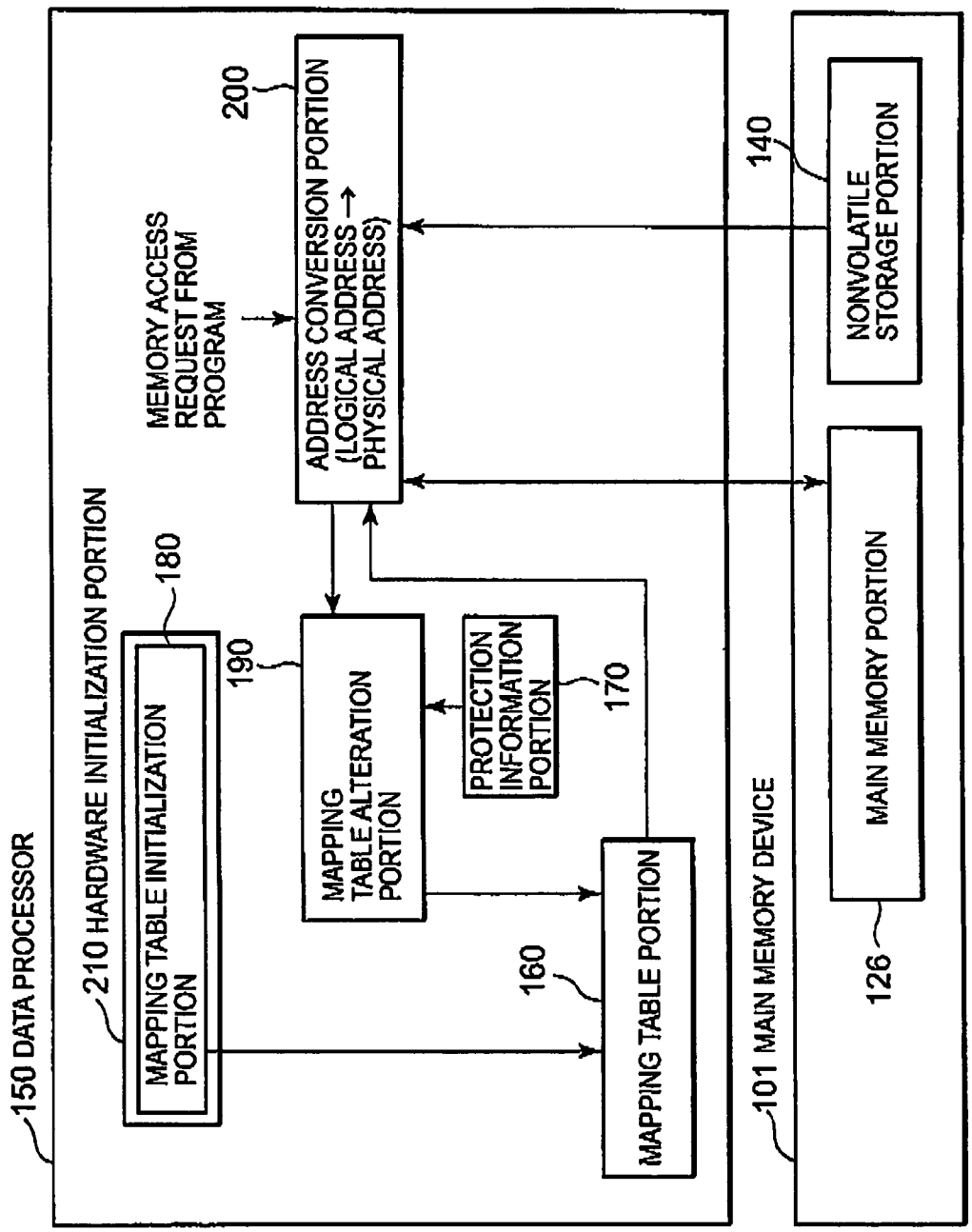
FIG. 13 is a configuration diagram illustrating an information processing apparatus to which a rapid restart method using a main memory image employed in a third embodiment of the present invention is applied.

Referring to FIG. 13, an information processing apparatus employing the main memory image method has at least a main memory device 101 and a data processor 150, and is operated under program control.

The main memory device 101 includes a main memory portion 126 and a nonvolatile storage portion 140.

The nonvolatile storage portion 140 is a portion to store a main memory image after the OS or application program has been initialized. The nonvolatile storage portion 140 may be any type of nonvolatile memory and, for example, may be a rewritable nonvolatile memory such as a flash RAM, or a read-only nonvolatile memory such as a ROM. For altering the content of a main memory image to be used, the nonvolatile storage portion 140 may be replaced.

Alternatively, if the nonvolatile storage portion 140 is rewritable, an image file may be downloaded using the network, or an image file may be retrieved from an external storage medium.

The main memory image stored in the nonvolatile storage portion 140 may be generated by any method. For example, it can be generated by dumping the main memory image immediately after the system is started up by a usual system startup method.

The main memory portion 126 is a portion constituting the main memory area other than the nonvolatile storage portion 140. This main memory portion 126 may be any type of readable/writable memory, and typically is a volatile memory such as a DRAM, SRAM, or the like. However, it is also possible to use a nonvolatile memory such as an MRAM (Magnetoresistive RAM), FeRAM (Ferroelectric RAM), or flash RAM.

The data processor 150 consists of a mapping table alteration portion 190, an address conversion portion 200 and a hardware initialization portion 210. The hardware initialization portion 210 has a mapping table initialization portion 180. The data processor 150 is further provided with a mapping table portion 160 and a protection information portion 170 as a control table.

The mapping table portion 160 is a control table for storing a protection mode and information for converting a memory address (logical address), that is designated when the OS or application program operating on the data processor 150 (hereafter, generally referred as the "program") operates the main memory device 101, into a memory address (physical address) that is actually assigned to the main memory portion 126 and the nonvolatile storage portion 140. As used herein, the logical address is composed of a logical block address and an in-block address, while the physical address is composed of a physical block address and the in-block address.

Figure 14:
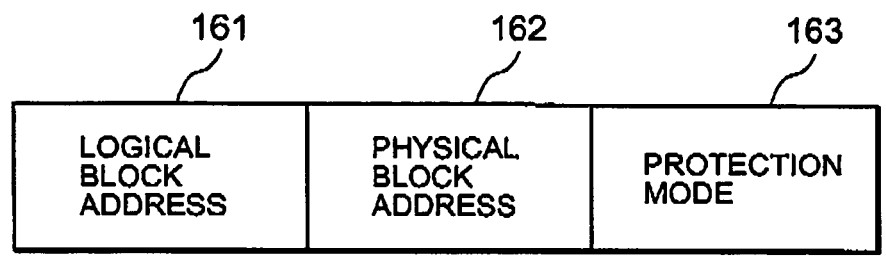
FIG. 14 is a diagram illustrating the entry configuration of a mapping table portion in the information processing apparatus to which the rapid restart method using a main memory image employed in the third embodiment of the present invention is applied.

FIG. 14 shows an example of structure of an entry in the mapping table portion 160. The mapping table portion 160 is formed by an assembly of such entries. Referring to FIG. 14, one entry holds a set of a logical block address 161, a physical block address 162 and a protection mode 163. The logical block address 161 is an address to uniquely identify each of individual logical blocks generated by dividing the logical address space into blocks with a predetermined size. The physical block address 162 is an address to uniquely identify each of individual physical blocks generated by dividing the physical address space into blocks having the same size as the logical address space. The blocks can be processed efficiently by using a unique unit called "page" for the architecture, whereas the main memory image method is not limited to this unit. The protection mode 163 assumes a value of either one of the read-only protection mode or the readable/writable protection mode. The protection mode 163 is a pseudo one, being different from the protection attribute that the program executed by the information processing apparatus originally has. Thus, for the blocks of the nonvolatile storage portion 140, the read-only protection mode is set uniformly at the startup of the system.

Figure 15:
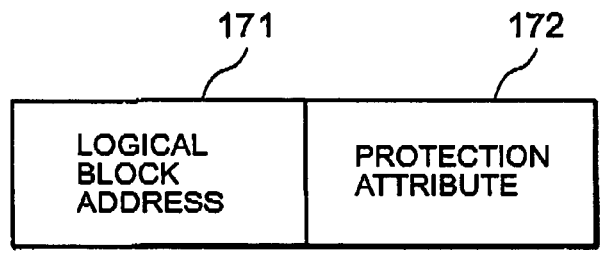
FIG. 15 is a diagram illustrating the entry configuration of a protection information unit in the information processing apparatus to which the rapid restart method using a main memory image employed in the third embodiment of the present invention is applied.

The protection information portion 170 is a control table which holds the protection attribute which the program executed on the information processing apparatus originally has. FIG. 15 shows an example of structure of an entry in the protection information portion 170. The protection attribute portion 170 is formed by an assembly of such entries. Referring to FIG. 15, one entry holds a set of a logical block address 171 and a protection attribute 172. The protection attribute 172 may be either read-only protection attribute or readable/writable protection attribute, and it is determined which protection attribute is set, based on the original protection attribute of the block specified by the logical block address 171.

The hardware initialization portion 210 is a portion to initialize the hardware in the various parts of the system when the information processing apparatus is started up or restarted, and has a mapping table initialization portion 180. This mapping table initialization portion 180 has a function to assign a physical address to the main memory portion 126 and the nonvolatile storage portion 140 forming the main memory device 101, and a function to initialize the mapping table portion 160. In general, it is possible by means of the BIOS function to assign a physical address to a device such as a memory that is under the control of a PCI bus rather dynamically without physically fixing the same. The mapping table initialization portion 180 has a similar physical address assigning function to that of the BIOS processing. However, the dynamic assignment of a physical address is not an essential element in the main memory image method, and the main memory image method is also applicable to a computer system in which a physical address is statically assigned. In the initialization of the mapping table portion 160, the physical blocks assigned to the nonvolatile storage portion 140 are sequentially associated with the logical blocks forming the logical address space, and the protection modes for all these blocks are set to read-only regardless of the original protection attribute of the blocks.

The address conversion portion 200 has a function to convert logical addresses designated by the program operating on the information processing apparatus during operation of the memory to physical addresses, and a function to detect an exception due to a protection mode violation and to start up exception processing. The conversion from the logical addresses to the physical addresses and the detection of an exception due to a protection mode violation are carried out by referring to the mapping table portion 160. The mapping table alteration portion 190 has a function to perform the exception processing started up by the address conversion portion 200. In the exception processing, the original protection attributes are determined by referring to the protection information portion 170, the blocks in the nonvolatile storage portion 140 are copied to main memory portion 126, and the mapping table portion 160 is updated.

Figure 16:
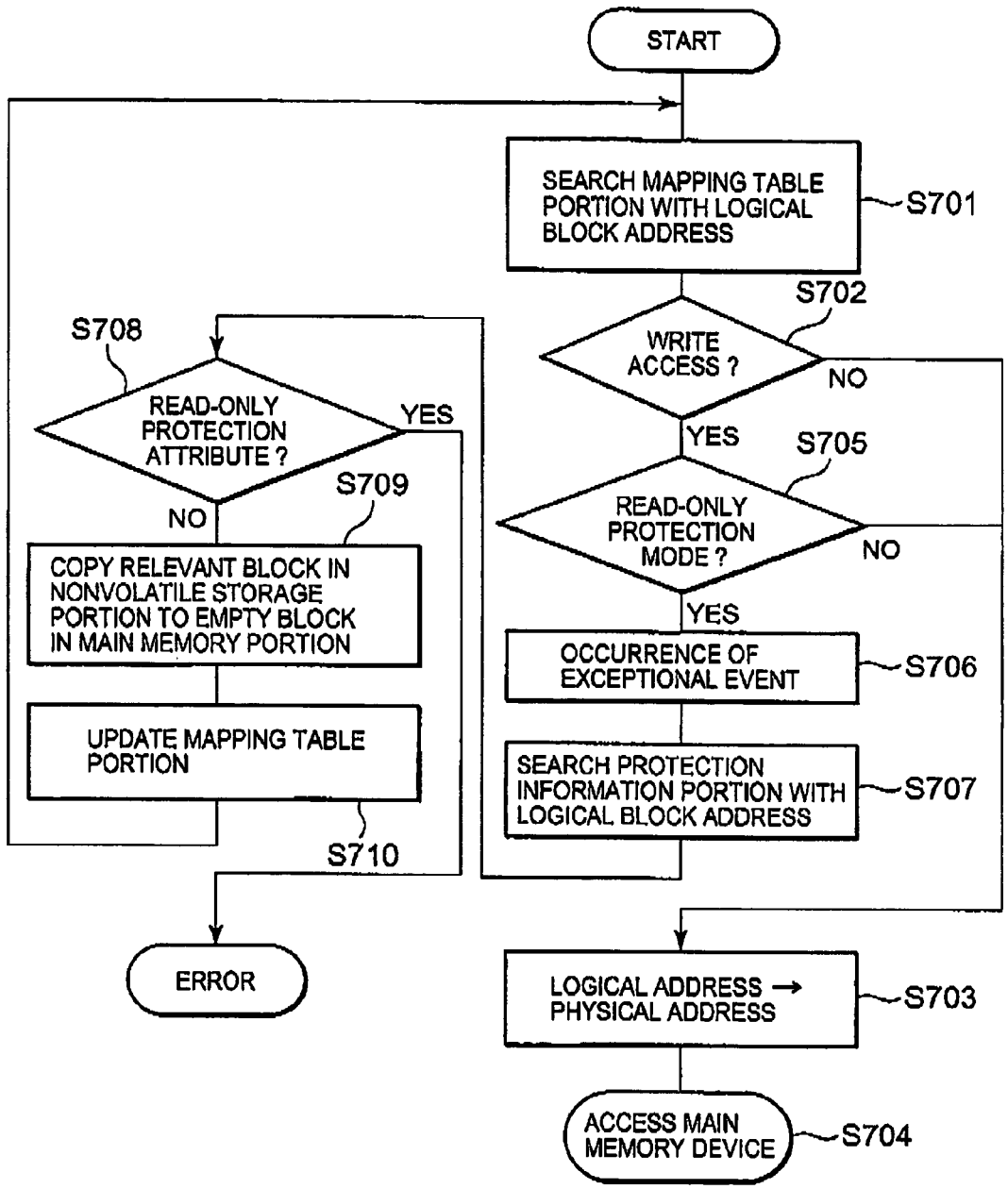
FIG. 16 is a flowchart illustrating processing by the information processing apparatus to which the rapid restart method using a main memory image employed in the third embodiment of the present invention is applied.

FIG. 16 shows an example of processing by the address conversion portion 200 and the mapping table alteration portion 190. The address conversion portion 200 searches the mapping table portion 160 with a block address in the logical address related to the memory access designated by the program to acquire an entry with which the logical block address 161 shown in FIG. 14 coincides (step S701). The address conversion portion 200 then determines whether the memory access designated by the program is write access or read access (step S702). If it is a read access (NO in step S702), the address conversion portion 200 converts the logical address designated by the program into a physical address, using the physical block address 162 in the entry acquired in step S701 (step S703), and accesses a place in the main memory device 101 specified by the physical address (step S704).

If the memory access designated by the program is write access (YES in step S702), the address conversion portion 200 determines whether the protection mode 163 in the entry acquired in step S701 is the read-only protection mode or readable/writable protection mode (step S705). If it is the readable/writable protection mode (NO in step S705), the address conversion portion 200 converts the logical address designated by the program into a physical address, using the physical block address 162 acquired in step S701 (step S703), and accesses a place in the main memory device 101 specified by the physical address (step S704).

When the protection mode 163 is the read-only protection mode (YES in step S705), the address conversion portion 200 temporarily suspends the processing of the memory access, and notifies the mapping table alteration portion 190 of an exceptional event to start up the exception processing (step S706). In this exceptional event, the logical block address 161 and the physical block address 162 in the entry acquired in step S701 are notified to the mapping table alteration portion 190.

The mapping table alteration portion 190 searches the protection information portion 170 with the notified logical block address 161 to acquire an protection attribute 172 of an entry having a matching logical block address 171 as shown in FIG. 15 (step S707). Subsequently, the mapping table alteration portion 190 determines whether the protection attribute 172 is a read-only protection attribute or readable/writable protection attribute (step S708). In case of a read-only protection attribute (YES in step S708), the mapping table alteration portion 190 notifies the address alteration unit 170 of an error, and the address conversion portion 200 performs error processing by refusing the suspended memory access, for example.

If the protection attribute 172 is a readable/writable protection attribute (NO in step S708), the mapping table alteration portion 190 copies the block in the nonvolatile storage portion 140 specified by the physical block address 162 notified by the address conversion portion 200 to an empty block in the main memory portion 126 (step S709). The mapping table alteration portion 190 then retrieves from the mapping table portion 160 an entry having a logical block address 161 shown in FIG. 14 which matches the logical block address notified by the address conversion portion 200, and rewrites the physical block address 162 of this entry to the physical block address of the block in the main memory portion 126 to which the block has been copied in step S709, while also rewriting the protection mode 163 to the readable/writable protection mode (step S710). The mapping table alteration portion 190 then notifies the completion of the exception processing to the address conversion portion 200. Upon receiving the notification of the completion of the exception processing from the mapping table alteration portion 190, the address conversion portion 200 again starts the memory access processing, that has been temporarily suspended, from step S701.

Figure 17:
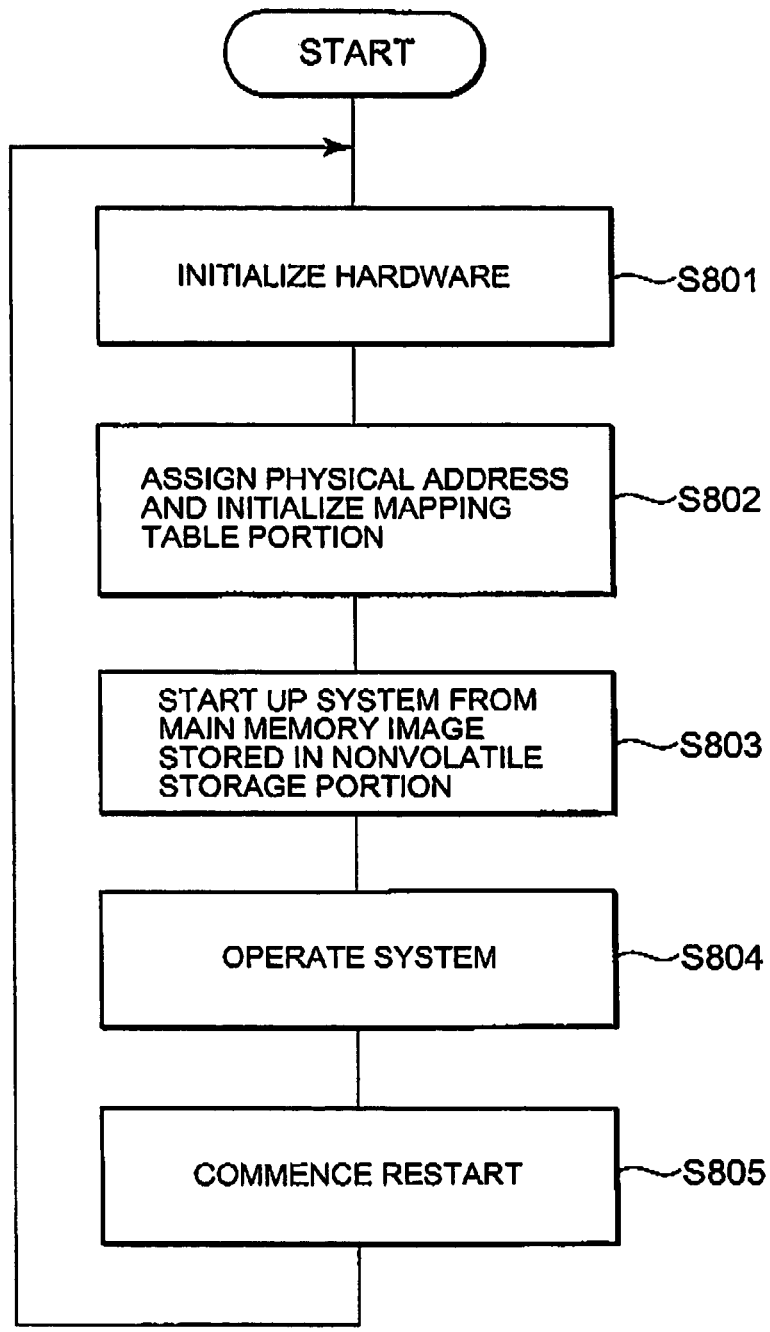
FIG. 17 is a flowchart illustrating processing by the information processing apparatus to which the rapid restart method using a main memory image employed in the third embodiment of the present invention is applied.

FIG. 17 is a flowchart schematically illustrating the operation of the information processing apparatus employing the main memory image method. Hereafter, the operation of the information processing apparatus employing the main memory image method will be described with reference to the drawings.

Upon startup, as shown in FIG. 17, the information processing apparatus initializes the hardware by means of the hardware initialization portion 210 (step S801), and then assigns a physical address to the main memory portion 126 and the nonvolatile storage portion 140 by means of the mapping table initialization portion 180 to initialize the mapping table portion 160 (step S802). In the initialization of the mapping table portion 160, the association relationship between the logical block addresses and the physical block addresses is written in the mapping table portion 160, and all the blocks in the nonvolatile storage portion 140 are registered in the mapping table portion 160 in the read-only protection mode.

Subsequently, the data processor 150 starts up the system from the main memory image stored in the nonvolatile storage portion 140 (step S803). Since this main memory image is in the same state as immediately after the startup of the OS or application, the system returns to the environment immediately after the initiation thereof. Therefore, there is no interruption of operation from when the system is started up from the main memory image to when the system operation becomes possible (step S804).

When the program performs a first write access to a certain block in the nonvolatile storage portion 140 in the step of the system operation (step S804), the block is mapped in the read-only protection mode. Therefore, the address conversion portion 200 notifies the exceptional event to temporarily suspend the write access (8706 in FIG. 16). Receiving the exceptional event, the mapping table alteration portion 190 determines the protection attribute of the block at the logical address at which the rewrite has occurred by referring to the protection information portion 170 (step S708 in FIG. 16). If the protection attribute is a readable/writable attribute, the mapping table alteration portion 190 allocates an empty block having the same size as the relevant block from the main memory portion 126, and copies the contents of the block in the nonvolatile storage portion 140 thereto (step S709 in FIG. 16). Further, the mapping table alteration portion 190 sets the allocated main memory block in the mapping table portion 160 so that the block is mapped at the logical block address at which the rewrite has occurred in the readable/writable protection mode, and thereby resumes the write access processing which has been temporarily suspended (step S710 in FIG. 16). As a result, the write access temporarily suspended and the subsequent write operations to the relevant block are executed with respect to the allocated main memory block. The time required for copying can be shortened by reducing the size of the block units, and thus the downtime of the system operation can be shortened.

When restarted under this condition (step S805 in FIG. 17), the processing is performed from the hardware initialization (step S801). Similarly to when started up, the contents of the mapping table portion 160 are initialized by operation of the mapping table initialization portion 180, and the nonvolatile storage portion 140 is remapped (step S802). This returns the system to the condition in which none of the contents written to the main memory portion 126 during the operation of the system is reflected. This gives the same effect as the system is returned to the environment immediately after the initiation.

In the information processing apparatus employing the main memory image method, as described above, the nonvolatile storage portion 140 stores the main memory image after the initialization processing of the OS and the application program, so that the data processor 150 starts up the system from the main memory image stored in the nonvolatile storage portion 140. This enables the quick startup of the system. When a write access occurs from the OS or application program to the nonvolatile storage portion 140 during the system operation, the data processor 150 copies data within the address range of a predetermined width including the address at which the write access has occurred, from the nonvolatile storage portion 140 to a substitute area secured in the main memory portion 126, and performs setting so that the subsequent accesses to the address range of the predetermined width is converted to accesses to the substitute area. Accordingly, the write access and the subsequent accesses to the access range of the predetermined width are converted to accesses to the substitute area, whereby the copy on the substitute area is updated. According to the present invention, the data required to be rewritten by the OS or application program is not copied sequentially from the nonvolatile storage portion 140 to the readable/writable main memory portion 126 at the startup of the system, but the copying is performed every time a write access occurs. This enables the system to start its operation immediately after the startup of the system.

These are the description of the rapid restart method using a main memory image. A description will now be made of a third embodiment of the present invention applying this rapid restart method with reference to the drawings.

Figure 18:
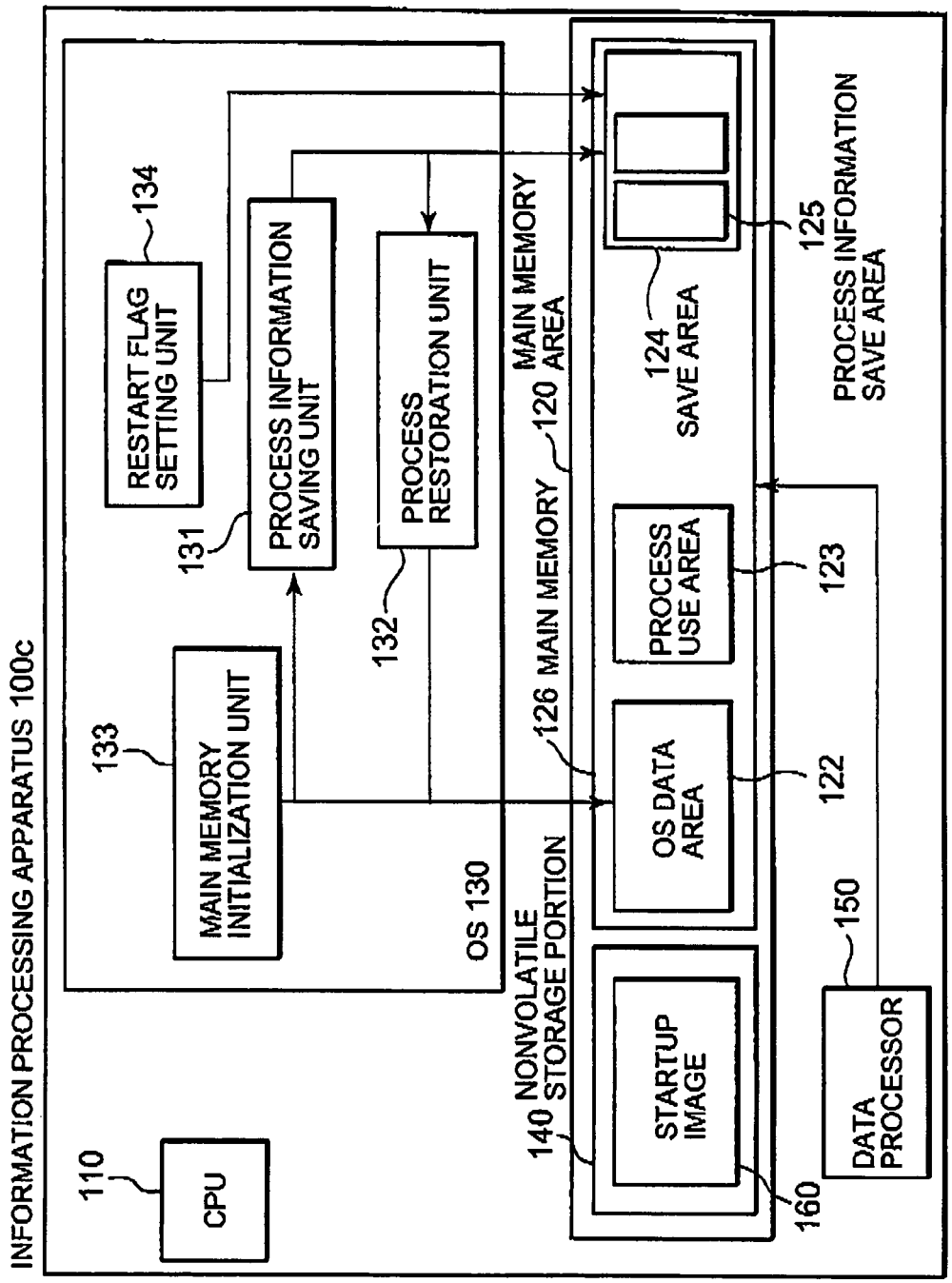
FIG. 18 is a block diagram showing configuration of the information processing apparatus according to the third embodiment of the present invention.

Referring to FIG. 18, an information processing apparatus 100c according to the third embodiment of the present invention is different from the information processing apparatus 100 of the first embodiment shown in FIG. 2, in that the main memory area 120 is composed of a main memory portion 126 and a nonvolatile storage area 140, and a data processor 150 is additionally provided.

Unlike the nonvolatile storage portion 140 shown in FIG. 13, the nonvolatile storage portion 140 stores only a startup image of the OS. This means that the nonvolatile storage portion 140 stores the contents on the main memory immediately after normal startup of the OS. The main memory image (startup image) of the OS stored in the nonvolatile storage portion 140 includes an OS program area and an OS data area. Although an OS data area 122 is also shown in the main memory portion 126, this OS data area 122 is an area created by being copied in step S709 in FIG. 16 as a result of the OS data area 122 in the nonvolatile storage portion 140 being accessed for writing during the operation, and corresponds to the "substitute area" described above.

The data processor 150 has configuration as described with reference to FIG. 13 and is in charge of address conversion or the like when a program is executed.

Figure 4B:
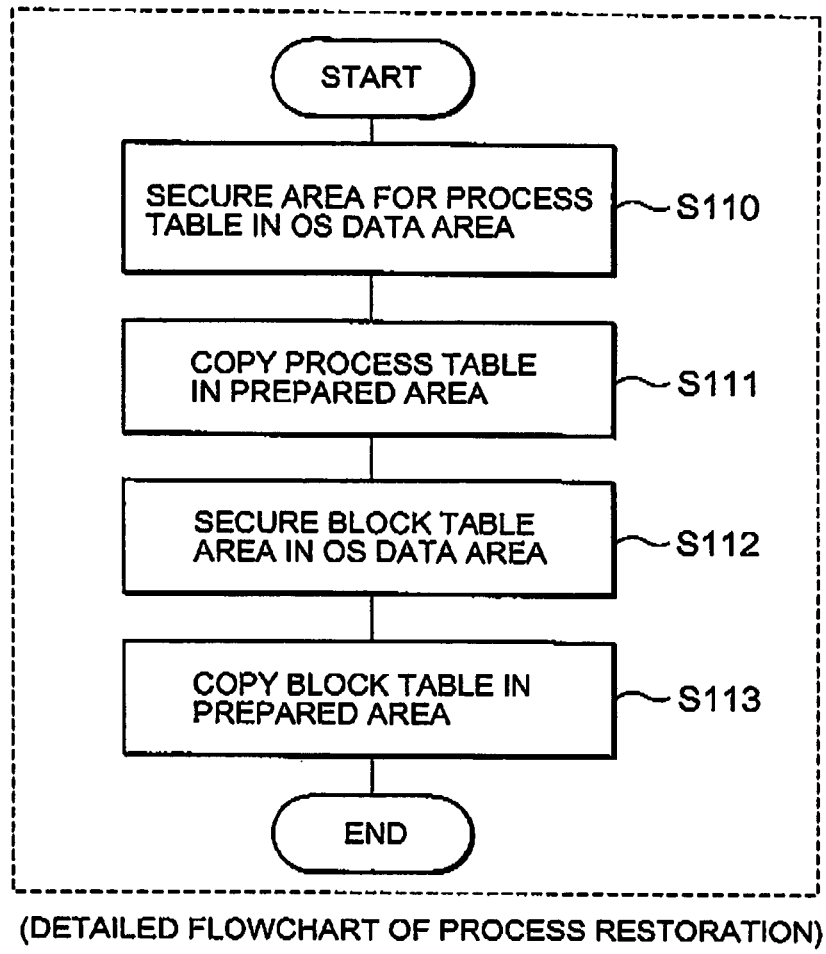

According to the third embodiment, the rapid restart method utilizing the main memory image of the OS is employed in the OS startup (8103) in FIGS. 4A and 4B illustrating the operation of the first embodiment. According to this embodiment, further, the processing particulars by the main memory initialization unit 133 differ from those in the first embodiment. Specifically, although the OS is required, similarly to the first embodiment, to recognize blocks already in use, it can be considered that the main memory image has already finished the initialization of the main memory area. Therefore, unlike the main memory initialization unit 133 of the first embodiment, it is not required to secure an area for the block identifier 400 on the main memory (S202), but is only required to check whether the area is used or not for an existing block identifier. Further, similarly to the first embodiment, it is necessary to know the save area using size 201 and the list of blocks used by the process.

Figure 19:
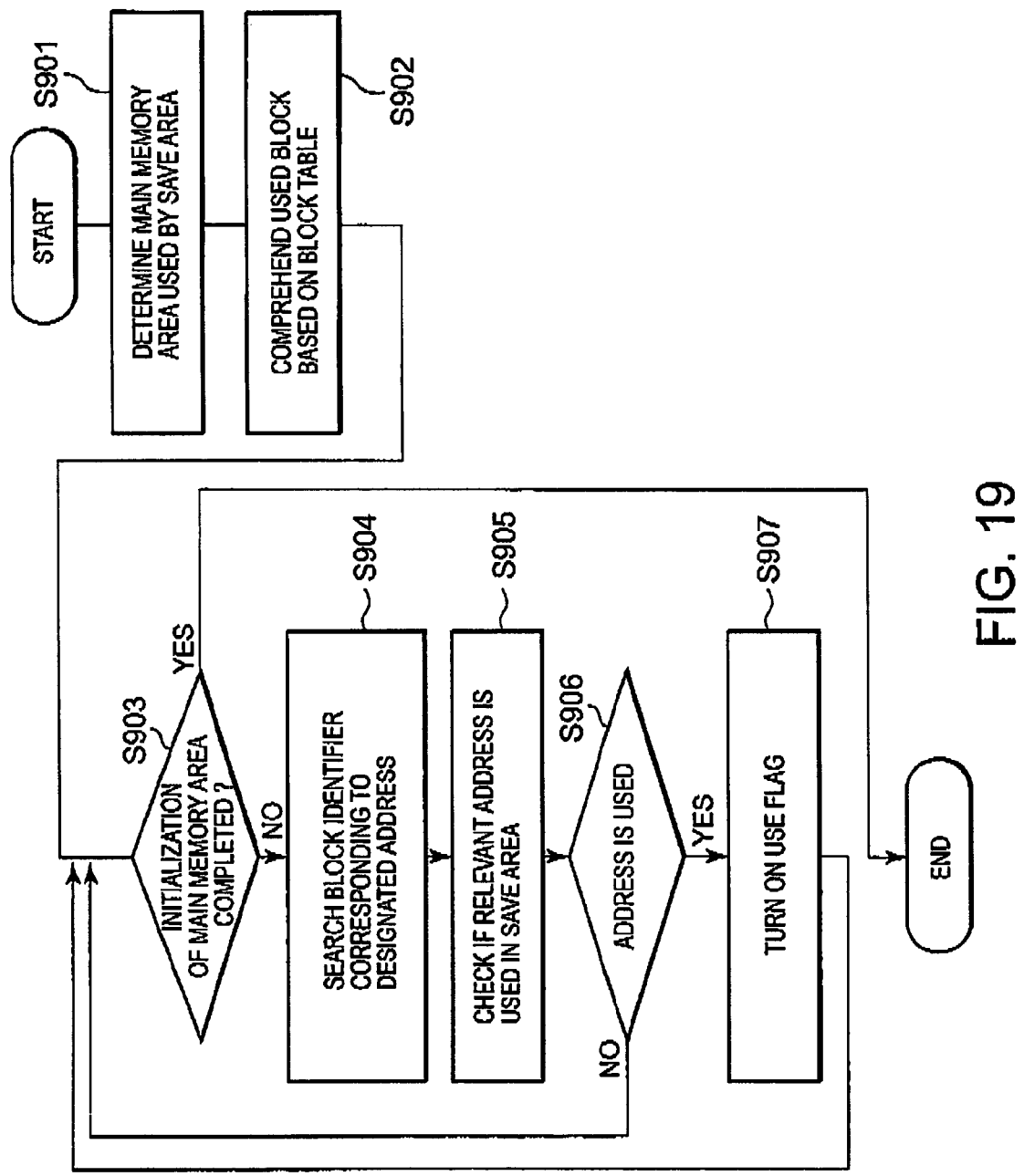
FIG. 19 is a flowchart illustrating processing by main memory initialization unit in the information processing apparatus according to the third embodiment of the present invention.

FIG. 19 is a flowchart illustrating the main memory initialization unit 133 according to this embodiment. The third embodiment differs from the first embodiment in that a main memory area for a block identifier is prepared and initialized to zero in the first embodiment (S204), whereas an existing block identifier is searched in the third embodiment (S904).

According to this embodiment, the OS startup image is utilized for startup of the OS. This eliminates the need of initialization processing and the input/output to/from an auxiliary storage device having a low transfer speed at the startup of the OS. Accordingly, the restart can be performed more rapidly than in the first embodiment. Of course, it is only the OS that is always restarted. As for the application that has been executed before the restart, it is determined whether it is to be restarted or to be continuously operated according to a value of the restart flag.

This third embodiment is embodied by applying the rapid restart method utilizing the main memory image to the first embodiment. However, it is also possible to apply the rapid restart method utilizing the main memory image to the modification of the first embodiment (FIG. 7) or the second embodiment to increase the OS restarting speed.

A fourth embodiment of the present invention will be described in detail with reference to the drawings.

Figure 20:
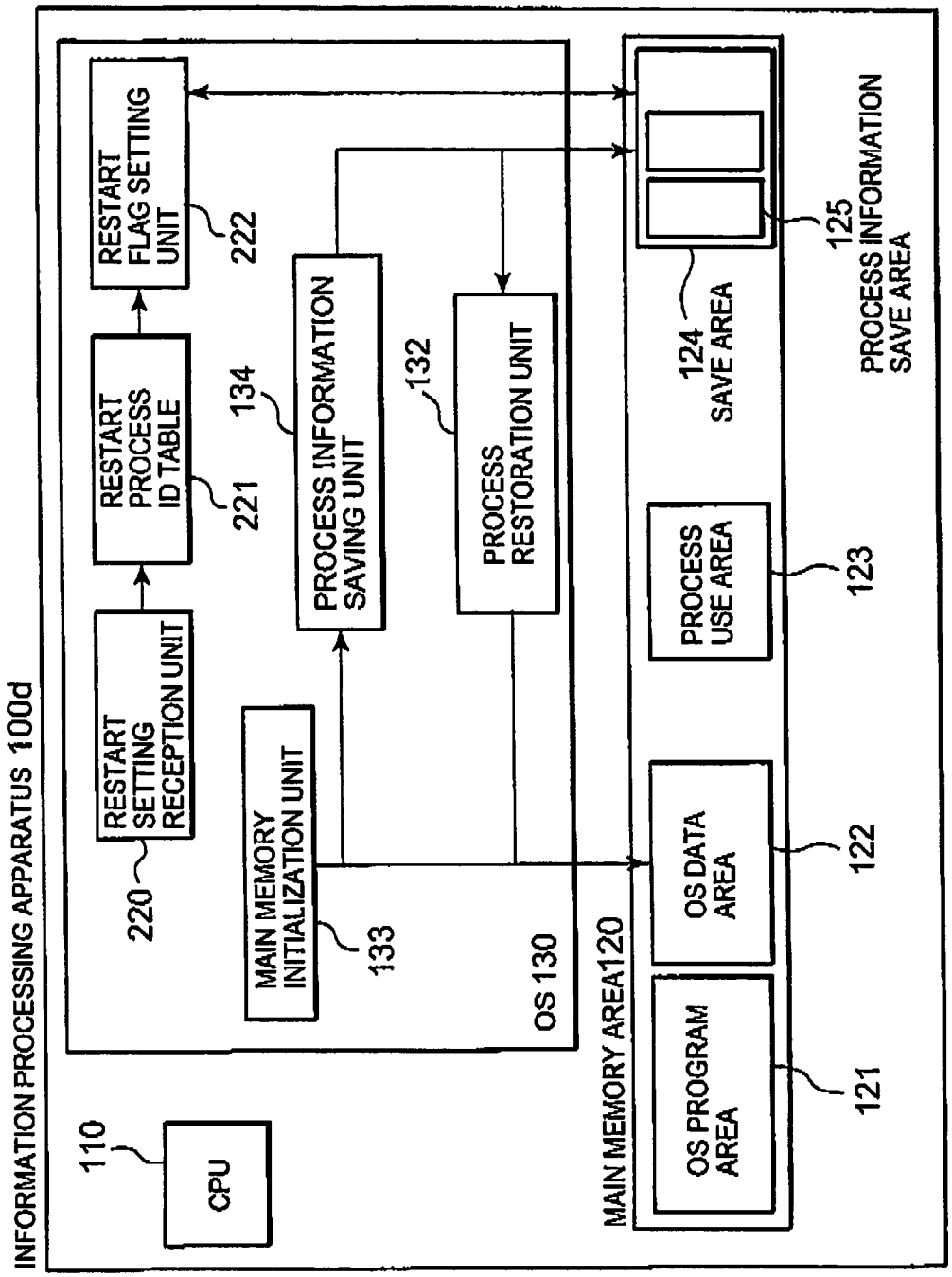
FIG. 20 is a block diagram showing configuration of an information processing apparatus according to a fourth embodiment of the present invention.

Referring to FIG. 20, an information processing apparatus 100d according to the fourth embodiment of the present invention differs from the information processing apparatus 100 according to the first embodiment shown in FIG. 2 in that restart setting reception unit 220, a restart process ID table 221 and restart flag setting unit 222 are provided in place of the restart flag setting unit 134.

The restart setting reception unit 220 is to receive the process ID of a process to be restarted from the user through a keyboard or the like and store the same in the restart process ID table 221. Like the restart flag setting unit 134 in the first embodiment, the restart flag setting unit 222 is to perform setting for a restart flag 204 provided in the process information save area 125 generated in the save area 124 by the process information saving unit 131 at an arbitrary time before the system shutdown. The restart flag setting unit 222 further has a function to search for restart flags 204 not only of the user's designated restart process the process ID of which is stored in the restart process ID table 221, but also of all the processes belonging to the same application as the restart process, and to set the restart flags 204 for theses processes.

Typically, when an application is composed of a plurality of processes, the plurality of processes are assigned with an identical process group ID, and stored in one entry of the process table 202. Accordingly, it can be known what other processes belong to a same application as a certain process by checking the process group ID stored in the process table 202.

Figure 21:
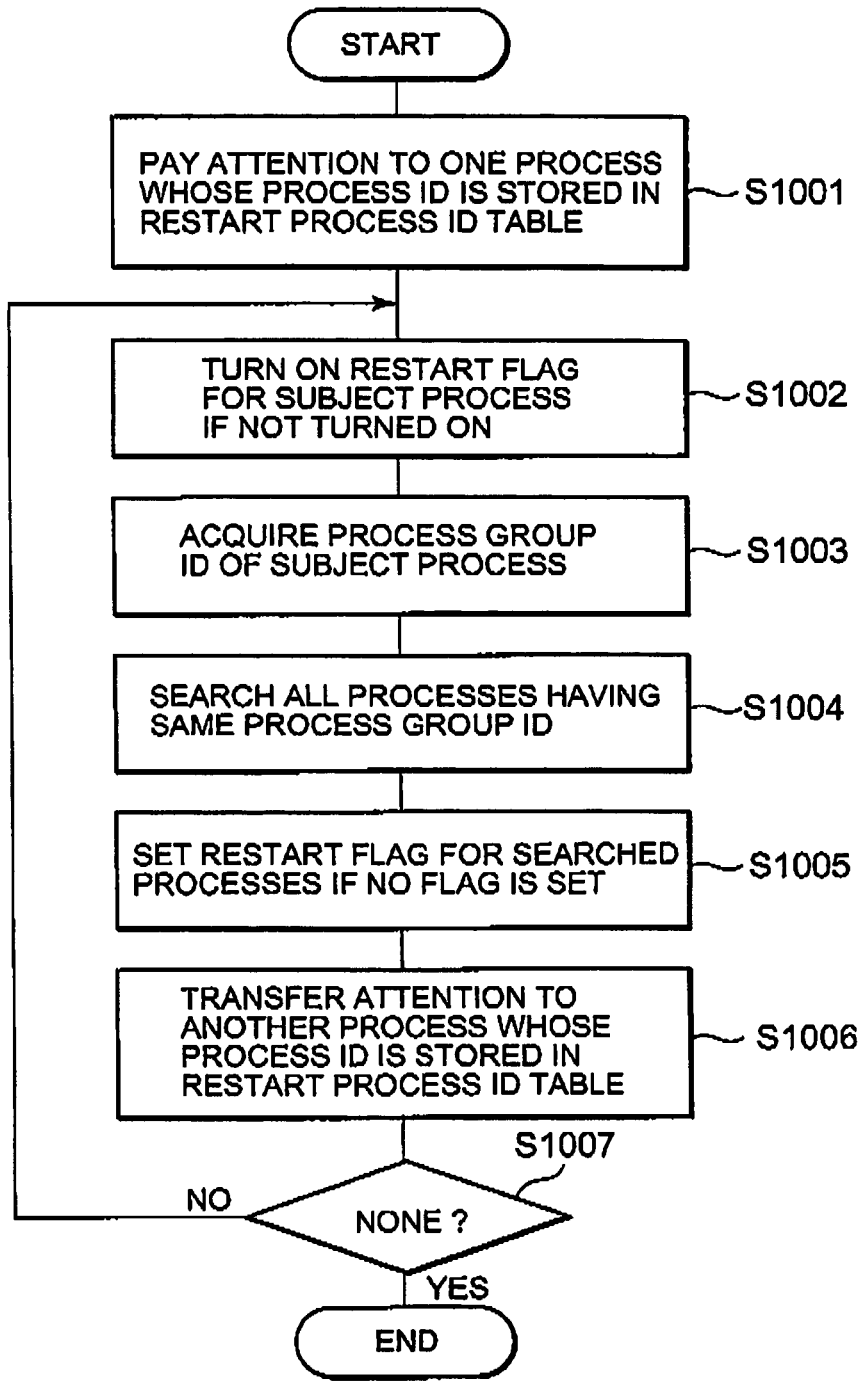
FIG. 21 is a flowchart illustrating processing by restart flag setting unit in the information processing apparatus according to the fourth embodiment of the present invention.

FIG. 21 is a flowchart illustrating the processing by the restart flag setting unit 222. The restart flag setting unit 222 first pays attention to one process whose process ID is stored in the restart process ID table 221 (step S1001). The restart flag setting unit 222 then accesses a restart flag 204 in the process information save area 126 corresponding to the process, and turns on the restart flag if not turned on (step S1002). Subsequently, a process group ID is acquired from the process table 202 for the subject process (step S1003). All other processes having the same process group ID are searched by checking the process group IDs in the process tables 202 of other process information save areas 125 (step S1004). The restart flags 204 in the process information save areas 125 for all the searched processes are accessed, and turned on if not turned on (step S1005). Subsequently, the attention is shifted to another process the process ID of which is stored in the restart process ID table 221 (step S1006), and similar processing to the processing described above is repeated, returning to step S1002. Once processing has been finished, paying attention to all the process IDs stored in the restart process ID table 221 (YES in step S1007), the processing terminates.

According to the fourth embodiment as described above, the user is only required to designate at least one of the plurality of processes making up the application as a restart process, and the rest of the processes are automatically processed as restart processes without being explicitly designated as the restart processes. Many of ordinary applications are composed of a plurality of processes and usually require a troublesome task to set restart individually for each of the processes. However, according to the embodiment, the user is saved from such troublesome task by collectively managing the plurality of processes making up the application. Additionally, it is possible to prevent such a mistake that the quantity of processes making up the application is found short after the restart (only one process of the application has been restarted).

The fourth embodiment is based on the first embodiment, whereas the idea thereof is also applicable to the second embodiment or the third embodiment.

A first working example of the present invention will be described with reference to the drawings. This working example corresponds to the first embodiment of present invention.

In this example, Linux is employed as a specific example of OS.

Information possessed by Kernel for managing a process in Linux includes a process descriptor and other structures associated with the process descriptor. The process descriptor holds most of the information required for executing the process. Other structures associated with the process descriptor include a file structure when a file is opened and a socket structure when a socket is opened to communicate with another computer. The process descriptor has a pointer to these associated structures, accommodated therein. These structures associated with the process descriptor correspond to the process table 202 in FIG. 3.

Linux manages the main memory area 120 in the units called "pages". The main memory area 120 used by a process is composed of a plurality of pages, and the OS prepares one page table for each process in order to collectively manage a plurality of pages. This page table corresponds to the block table 203.

In order to interrupt a process and to continuously execute the process after restart, data stored in the register in the CPU is required in addition to the process descriptor, the page table, and the memory area used by the process, if the process is being executed. A multitask OS switches processes in order to execute a plurality of processes simultaneously.

The data in the CPU of the process the execution of which is temporarily interrupted by the switching of the processes is stored after being divided into a task state segment and a Kernel-mode stack. The task state segment is one of entries in the process descriptor, and the Kernel-mode stack is part of the memory area used by the process. When recommencing the process, the condition of the CPU register when the process is interrupted is restored from the task state segment and the Kernel-mode stack and the execution is recommenced.

Figure 22:
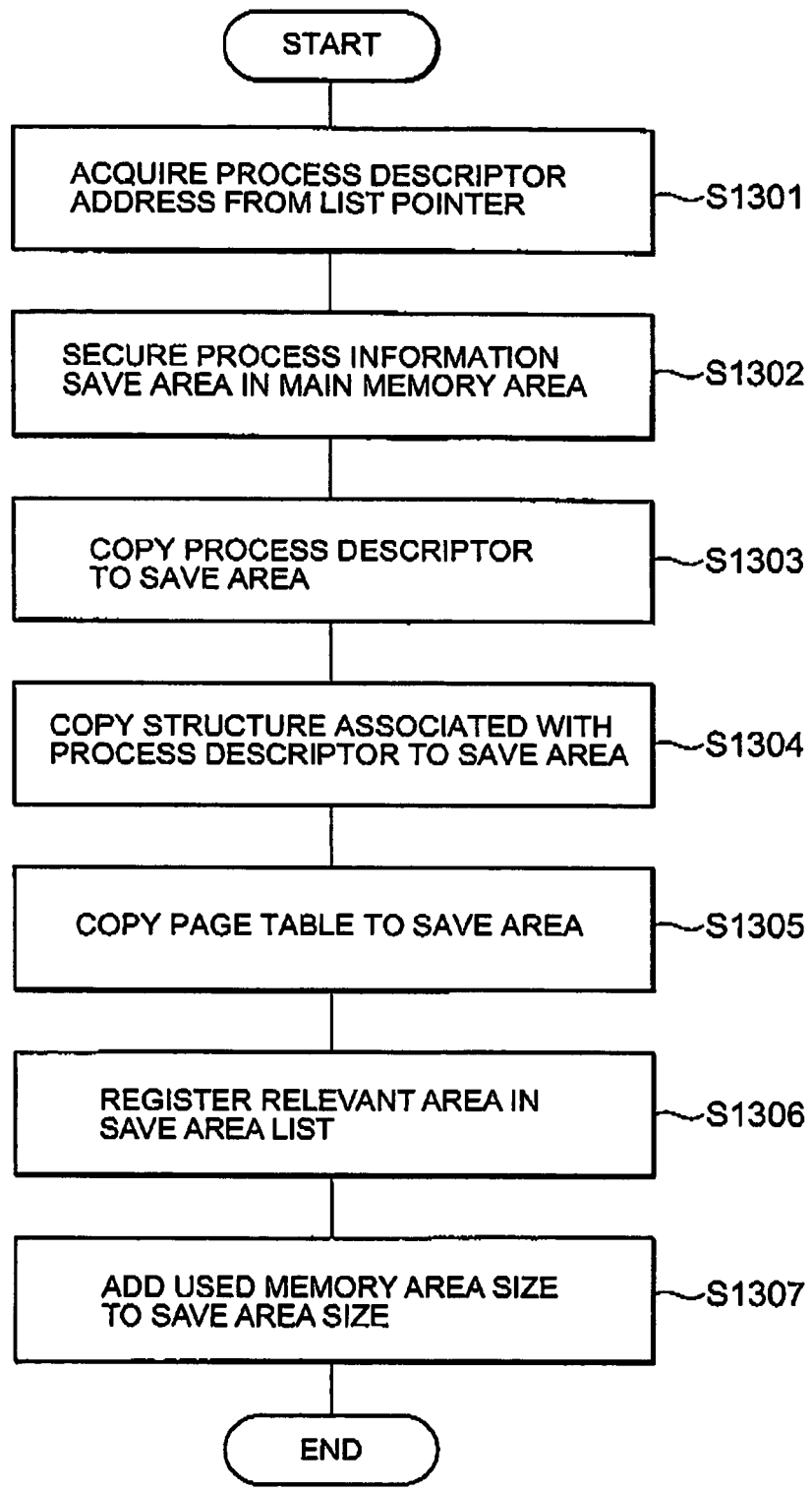
FIG. 22 is a flowchart illustrating processing by the process information saving unit according to a first working example of the present invention.

The process information saving unit 131 saves the information on the process described above (e.g., the process descriptor and the page table) into the process information save area 125. FIG. 22 shows processing by the process information saving unit 131 in Linux.

The process descriptors generated for all the processes are configured in a list. The top address of the process descriptor is stored in a variable called init_task. In the first step, the process descriptor address is acquired from init_task (step S1301). Subsequently, the process information save area 125 is secured on the main memory (step S1302), and the process descriptor is copied to the process information save area 125 thus generated (step S1303). Similarly, other structures associated with the process descriptor and the page tables are also copied to the process information save area 125 (step S1304, S1305). The process information save area 125 is registered in the unidirectional list 205 (step S1306), and the used main memory size is added to the save area using size 201 (step SI 307).

A series of processing by the process information saving unit 131 is completed in this manner. This processing is performed for all the processes generated. Linux is shut down normally after the process information save area 125 has been created for all the processes.

At the system startup, two types of processings, namely main memory initialization and process restoration are performed.

Linux manages the main memory in the units called "pages". Each page has a region called "page descriptor" in which information relating to the page is stored. At the startup, Linux initializes the main memory area 120 that can be used, by dividing the entire main memory area 120 except for the region used by the Linux itself and the hardware, into pages and assigning a page descriptor to each of the pages. This processing is common through all the OSs managing the main memory area 120 in certain units (in pages or segments). The OS is required, at the time of the main memory initialization, to recognize a main memory space used by any process that is not to be restarted. The page in this example corresponds to the block in the first embodiment, while the page descriptor corresponds to the block identifier 400.

As described above, Linux manages the main memory area 120 in the units called pages, and there is a page descriptor in each of the pages on the main memory. The initialization of this page descriptor in Linux corresponds to the initialization of the main memory area 120. In Linux packaging, the page descriptor is arranged directly behind the area called "OS reserved area" prepared for developing the OS on the memory, and has a fixed length. Accordingly, the position of the page descriptor on the main memory and the size thereof are not varied after the restart. Further, it is managed by a count variable in the page descriptor whether or not a page in the main memory area 120 is being used. The page is being used if the count variable is one or more. When a plurality of processes use a shared memory, one page is used by the plurality of processes. In this case, the count variable assumes a value of one or more.

Figure 23:
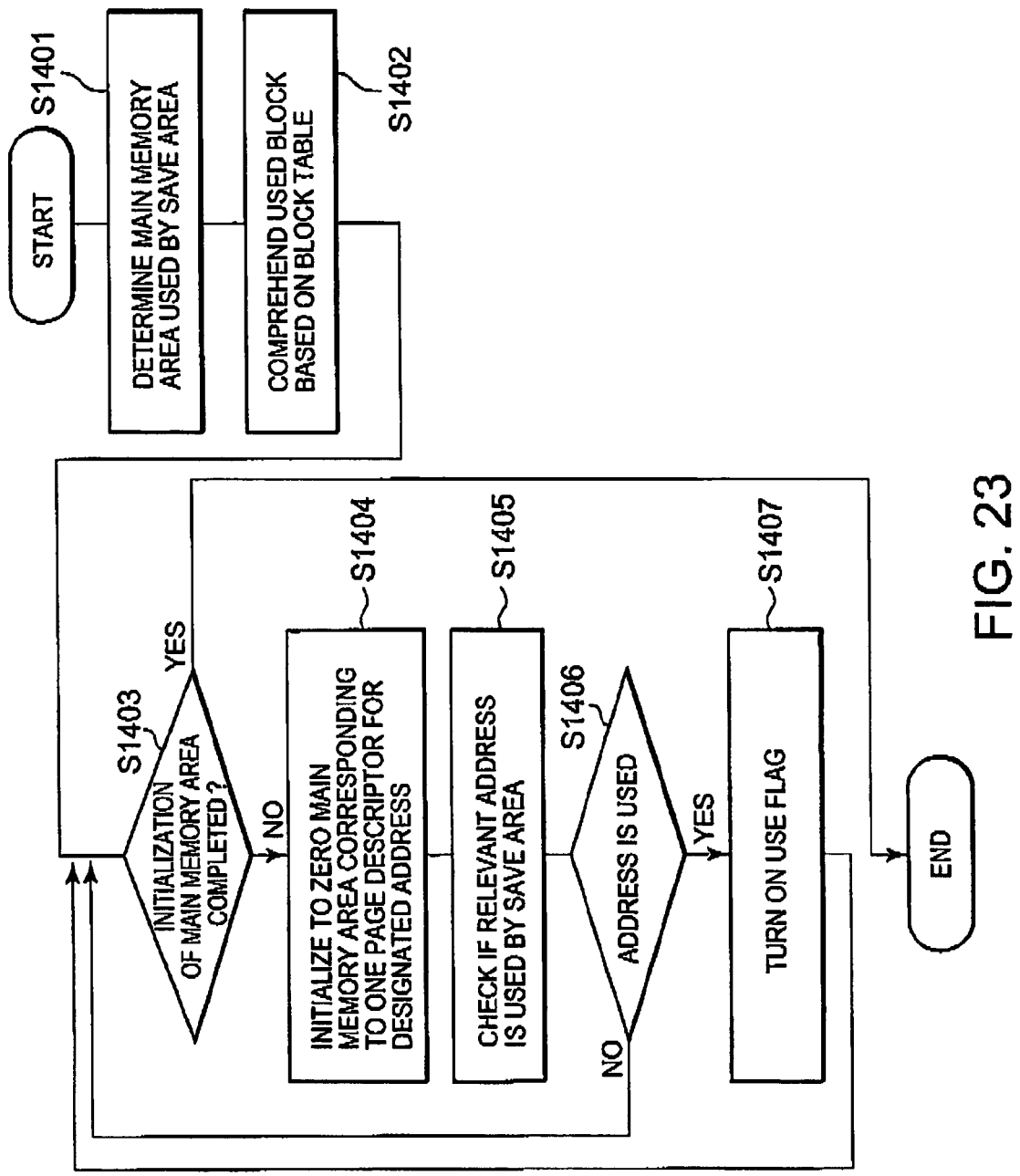
FIG. 23 is a flowchart illustrating processing by the main memory initialization unit according to the first working example of the present invention.

FIG. 23 illustrates the processing by the main memory initialization unit 133 in this example. In the first step, the main memory area 120 used by the save area 124 is determined based on the save area using size 201 (step S1401). Subsequently, the page tables in all the process information save area 125 present in the save area 124 are searched to check which page is used by which process (step S1402). The checking results are held as page descriptor serial numbers and tables of the quantity of the processes being used.

The page descriptors are established from the first address in the main memory area 120 (to be exact, the address directly behind the OS reserved area). One descriptor area is prepared for each of the designated addresses and initialized to zero (step S1404). Subsequently, it is checked whether or not the designated address is used by the page table stored in the save area 124 (step S1405). This checking is performed by using the page descriptor serial numbers and the tables of the quantity of processes being used stored as the checking results. If the address is used (YES in step S1406), the number of processes used is assigned to the count variable in the page descriptor (step S1407). If the address is not used (NO in step S1406) or when the processing of step S1407 has been completed, the processing proceeds to initialization of the next page descriptor. Once all the main memory areas 120 that can be used have been initialized (YES in step S1403), the processing by the main memory initialization unit 133 terminates.

The process restoration unit 132 copies the other structures associated with the process descriptor and the page table to the OS data area 122 prepared for restoration, and is similar to the process restoration processing described in relation to the first embodiment.

A working example of the second embodiment will now be described.

Figure 24:
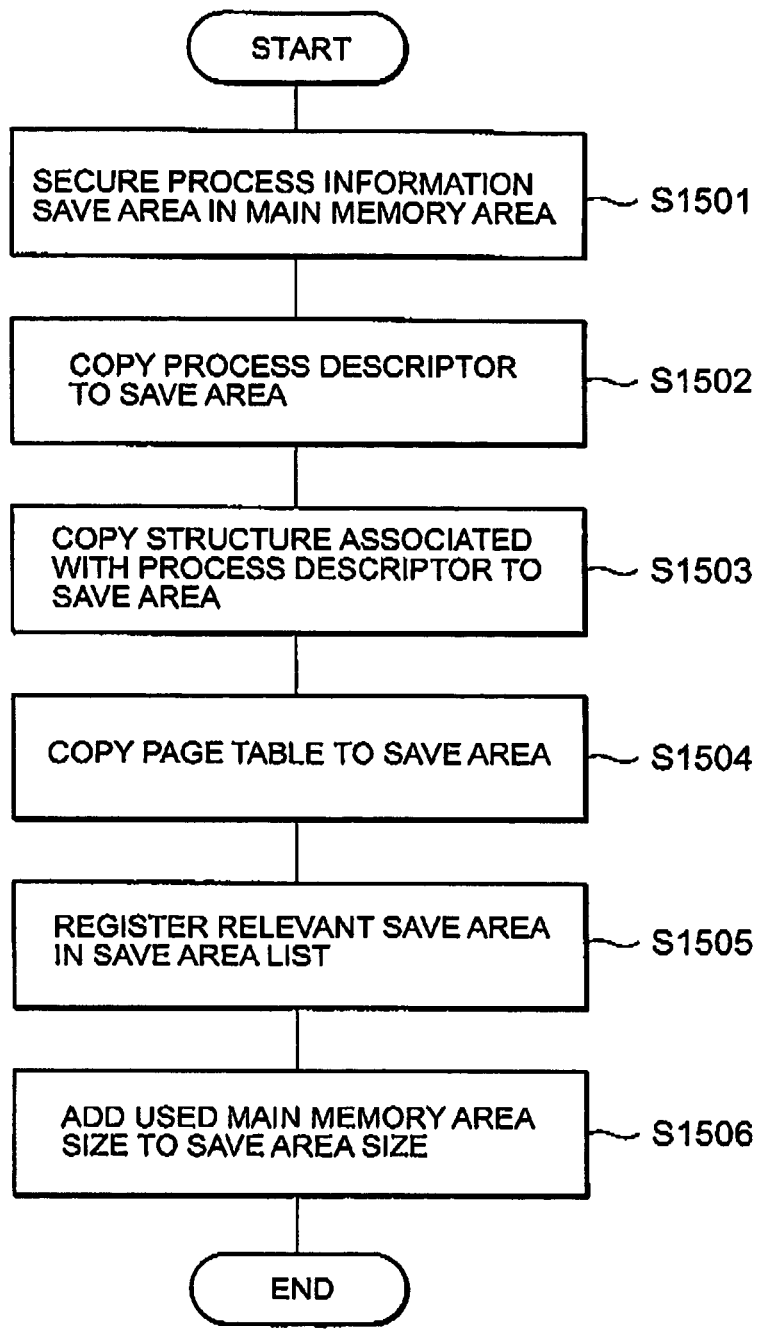
FIG. 24 is a flowchart illustrating processing by the process save information generating unit according to a second working example of the present invention.

FIG. 24 illustrates particulars of the processing by the process save information generating unit 135 at the generation of a process.

Upon being instructed by the user to execute a program, the OS generates a process. Hereafter, this process shall be referred to as "process A". After being generated, the process A is not executed until the process descriptor is registered in the process execution queue. The process save information generating unit 135 executes the process before the process is registered in the process execution queue. At the time when the process A is generated, the address at which the process descriptor is stored is already held by the OS (the process descriptor of the generated process A is stored in the temporary variable in the OS). Therefore, the processing to acquire the address of the process descriptor is not performed. In the first step, an area for storing save information of the process A is secured on the memory (step S1501).

Subsequently, the process descriptor of the process A is copied to the secured process information save area 125 (step S1502). Further, other structures associated with the process descriptor (e.g., the file structure and socket structure) are copied to the save area 125 (step S1503). The page table of the process A is then copied to the save area 126 (step S1504). The address at which the page table is located is stored in the memory descriptor in the process descriptor, and therefore this address is referred to. Finally, the save area 125 is registered in the save area list, and the used main memory size is added to the save area size (step S1505, S1506).

Figure 25:
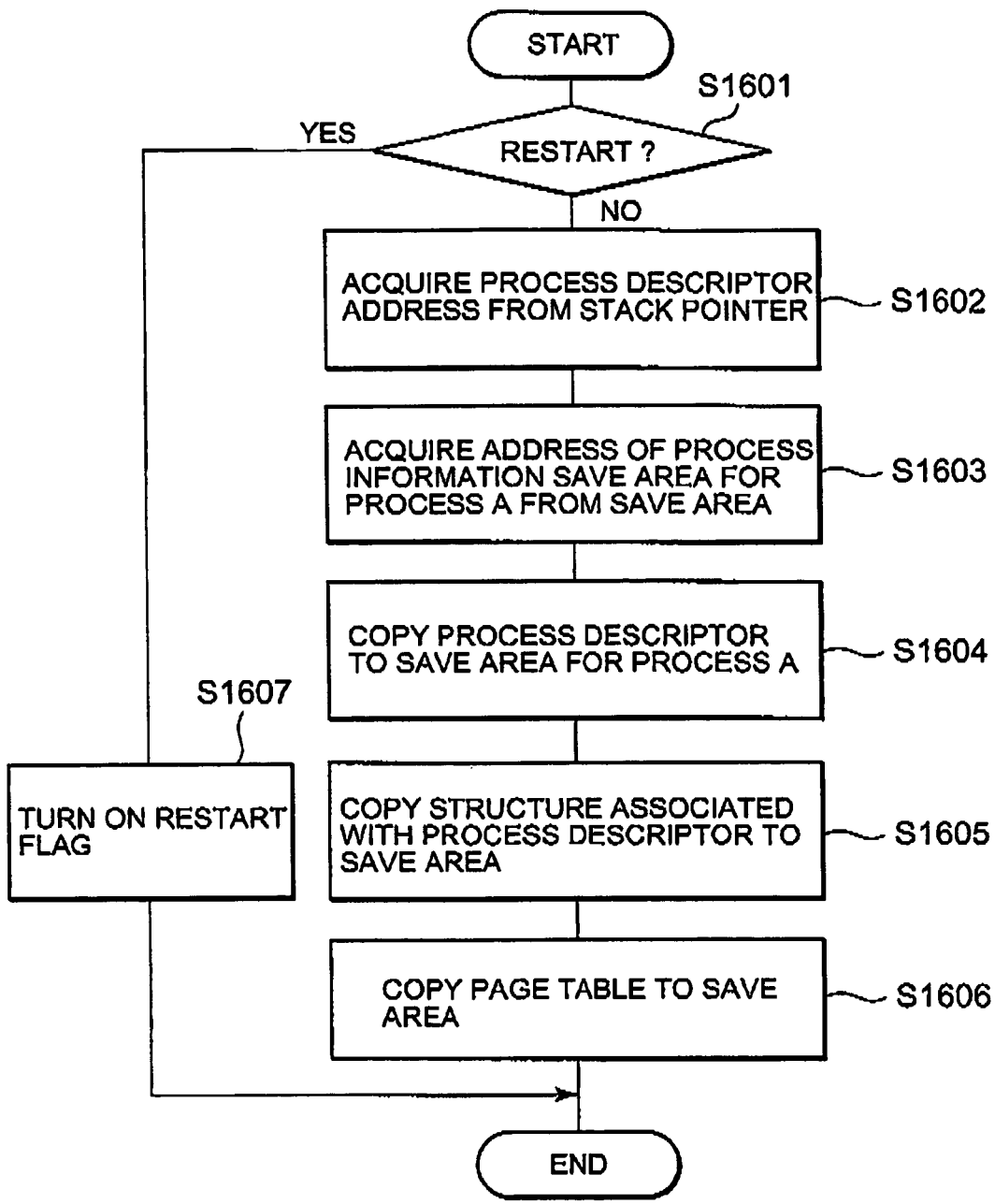
FIG. 25 is a flowchart illustrating processing by the process save information updating unit according to the second working example of the present invention.

FIG. 25 illustrates particulars of processing by the process save information updating unit 136. The update processing is performed before all the processing relating to process switching has been completed and register information of the process to be subsequently executed is restored from the task state segment. Before performing the update processing of the process information save area 125 for the process A, it is checked whether or not an instruction to restart the process has been received from the user. This instruction may be packaged as a system call or may be given by other method. When the instruction to restart the process has been received from the user (YES in step S1601), the update processing is terminated by turning on the restart flag 203 in the process information save area 125 for the process A (step S1607). If no restart instruction has been given by the user (NO in step S1601), the following processing is performed.

In the first step, an address of the process descriptor is acquired from the stack pointer for the process A (step S1602). In the next step, an address of the process information save area 125 for the process A is acquired from the save area 124. As seen by referring to the data structure of the save area 124 in FIG. 3, the save area 124 manages the process information save area 125 for each process by means of a list. Accordingly, the address of the process information save area 125 for the target process can be obtained by acquiring the address at the top (the process information save area 125 at the top of the list) and then searching the list. It can be known which process information save area 125 in the save area 124 is currently accessed by looking at the process ID in the process descriptor that has been copied at the time of the generation of the process. Once the address of the save area 124 for the process A is acquired, the structures associated with the process descriptor of the process A are copied to the process information save area 125 for the process A (steps S1604 and S1605). Finally, the page table is copied (step S1606).

The particulars of the processing by the process information save area releasing unit 137 at the process termination are similar to those of the second embodiment. An address of the process information save area 125 for the process A is first acquired from the list of the save area 124. Upon acquiring the address, the process information save area 125 is deleted from the list to release the area. Then the process termination processing is performed.

All the save processing of the process information possessed by the OS is completed in this manner. The generation of the save information during operation of the computer system eliminates the need of performing termination processing at the restart. Accordingly, the number of accesses to the auxiliary storage device due to the termination processing is reduced and hence the time required for the restart can be shortened.

INDUSTRIAL APPLICABILITY

A first advantage of the present invention resides in that the system shutdown time can be reduced. The reason therefor is as follows. The system shutdown processing consists of OS shutdown processing and application shutdown processing. The OS is terminated normally, whereas the application shutdown processing is performed only by saving the process information such as a process table of the processes making up the application to the save area on the main memory. Therefore, the access to the auxiliary storage device having a low transfer speed which is performed in association with the application shutdown processing is reduced, and hence the system shutdown time can be shortened.

A second advantage of the present invention resides in that an application which has been operated before restart can be continuously executed after the restart. This is for the reason as follows. The process information such as a process table is saved from the main memory that is used by the OS before restart and, after the restart, the process information such as the process table is restored on the main memory used by the OS. Therefore, the process, the process table of which has been saved and restored, seems as if it were continuously operated, whereas the execution thereof is interrupted and recommenced. Consequently, the application in which no fault has occurred is enabled to continuously provide the service.

The present invention, which does not interrupt the provision of service to the user at the restart, can be applied to a usage such as a large-scale application server which is required to continue operation for a long period of time. The present invention is also applied to a usage in which, when an OS such as Windows on an ordinary personal information processing apparatus is restarted after rewriting the registry, only the OS is restarted so that the rewritten registry information is reflected while leaving the user's working environment unchanged.

The invention claimed is:

1. A rapid restart method comprising:
copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;
initializing, at the restart of the OS, the main memory area of the main memory device used by the OS while not restarting the one or more save areas used by the one or more user processes; and
restoring the copied process information from the one or more save areas to the restarted OS loaded on the main memory area after completion of the restart of the OS.

2. The rapid restart method according to claim 1, wherein the OS is started up from an OS main memory image stored in a nonvolatile storage portion forming a part of the main memory device.

3. The rapid restart method according to claim 2, wherein every time occurs a write access from the OS to the nonvolatile storage portion during system operation, data in an address range having a predetermined width including the address at which the write access has occurred is copied from the nonvolatile storage portion to a substitute area ensured in a readable/writable main memory portion forming a part of the main memory device, and subsequent accesses to the address range having the predetermined width are converted to accesses to the substitute area.

4. The rapid restart method according to claim 1, wherein a size of the one or more save areas is dependent on a size of an area that one or more user processes use in the main memory area.

5. The rapid restart method according to claim 1, wherein a size of the one or more save areas is dependent on a number of user processes running on the OS.

6. A rapid restart method comprising:
copying, before restart of an OS loaded on a main memory area of a main memory device, process information to one or more save areas on the main memory device, while setting a restart flag for the copied process information to designate whether one or more processes are to be restarted or not, the OS generating the process information that comprises a process condition of the one or more user processes in accordance with execution of the one or more user processes to manage the one or more user processes, and the one or more save areas being previously created in accordance with a number of the one or more user processes;
initializing, at the restart of the OS, the main memory area of the main memory device used by the OS while not restarting the one or more save areas used by the one or more user processes for which the restart flag is set not to restart; and
restoring, from the one or more save areas, the copied process information of the one or more user processes for which the restart flag is set not to restart to the restarted OS loaded on the main memory area, after completion of the restart of the OS.

7. The rapid restart method according to claim 6, wherein when a restart flag is set for process information relating to a certain user process to designate whether the process is to be restarted or not, all the user processes belonging to the same user application program as the user process are searched, and restart flags in the process information relating to all the searched user processes are also set to the same value.

8. A rapid restart method comprising:
copying, before restart of an OS loaded on a main memory area of a main memory device, process information, to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;
initializing, at the restart of the OS, the main memory area of the main memory device used by the OS while not restarting the one or more save areas used by the one or more user processes; and
restoring the copied process information from the one or more save areas to the restarted OS loaded on the main memory area, after completion of the restart of the OS.

9. A rapid restart method comprising:
copying, before restart of an OS loaded on a main memory area of a main memory device, process information, to one or more save areas on the main memory device by referring to a process ID table in which an identifier for a process to be continuously operated or a process not to be continuously operated after restart of the OS, the OS generating the process information that comprises a process condition of one or more user processes in accordance with execution of the one or more user processes to manage the one or more user processes, and the one or more save areas being previously created in accordance with a number of the one or more user processes;
initializing, at the restart of the OS, the main memory area of the main memory device used by the OS while not restarting the one or more save areas used by the one or more user processes; and
restoring the copied process information from the one or more save areas to the restarted OS loaded on the main memory area, after completion of the restart of the OS.

10. A rapid restart method comprising:
copying, at generation of one or more user processes, process information to one or more save areas on a main memory device, the OS generating the process information that comprises a process condition of one or more user processes in accordance with execution of the one or more user processes to manage the one or more user processes, and the one or more save areas being previously created in accordance with a number of the one or more user processes;
setting, at switching of the one or more user processes, a restart flag for the saved process information to designate whether the one or more user processes are to be restarted or not, while updating the process information saved in the one or more save areas to the latest state if the one or more user processes are not to be restarted;
nullifying the copied process information, at termination of the one or more user processes;
initializing, at restart of the OS loaded on a main memory area of the main memory device, the main memory area of the main memory device used by the OS while not restarting the one or more save areas used by the one or more user processes for which the restart flag is set not to restart; and restoring, after completion of the restart of the OS, the copied process information of the one or more user processes for which the restart flag is set not to restart from the one or more save areas to the restarted OS loaded on the main memory area.

11. The rapid restart method according to claim 10, wherein when a restart flag is set for process information relating to a certain user process to designate whether the process is to be restarted or not, all the user processes belonging to the user application program as the user process are searched, and restart flags in the process information relating to all the searched user processes are also set to the same value.

12. An information processing apparatus comprising:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;

main memory initialization means for initializing, at the restart of the OS, the main memory area of the main memory device used by the OS while not initializing the one or more save areas used by the one or more user processes; and process restoration means for restoring the copied process information from the one or more save areas to the restarted OS loaded on the main memory area, after completion of the restart of the OS.

13. The information processing apparatus according to claim 12, further comprising means for starting up the OS from an OS main memory image stored in a nonvolatile storage portion forming a part of the main memory device.

14. The information processing apparatus according to claim 13, comprising means for copying, at every occurrence of a write access from the OS to the nonvolatile storage portion during system operation, data in an address range having a predetermined width including the address at which the write access has occurred from the nonvolatile storage portion to a substitute area ensured in a readable/writable main memory portion forming a part of the main memory device, and for converting subsequent accesses to the address range having the predetermined width to accesses to the substitute area.

15. An information processing apparatus comprising:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;

restart flag setting means for setting a restart flag for the copied process information to designate whether the one or more processes are to be restarted or not;

main memory initialization means for initializing, at the restart of the OS, the main memory area of the main memory device used by the OS while not initializing the one or more save areas used by the one or more user processes for which the restart flag is set not to restart; and process restoration means for restoring, after completion of the restart of the OS, the copied process information of the one or more user processes for which the restart flag is set not to restart from the one or more save areas to the restarted OS loaded on the main memory area.

16. The information processing apparatus according to claim 15, comprising means for searching, when a restart flag is set for process information relating to a certain user process to designate whether the process is to be restarted or not, all the user processes belonging to the same user application program as the user process, and setting restart flags in the process information relating to all the searched user processes to the same value.

17. An information processing apparatus comprising:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;

main memory initialization means for initializing, at the restart of the OS, the main memory area of the main memory device used by the OS while not restarting the one or more save areas used by the one or more user processes; and process restoration means for restoring the copied process information from the one or more save areas to the restarted OS loaded on the main memory area, after completion of the restart of the OS.

18. The information processing apparatus according to claim 17, wherein, before the restart of the OS, the process information saving means saves process information in the OS relating to a user process to be continuously operated after restart of the OS, to the one or more save areas on the main memory device, by referring to a process ID table storing identifiers of processes to be continuously operated or of processes not to be continuously operated.

19. An information processing apparatus comprising:

process save area generating means for copying, at generation of one or more user processes, process information to one or more save areas on a main memory device, the OS generating the process information that comprises a process condition of the one or more user processes in accordance with execution of the one or more user processes to manage the one or more user processes, and the one or more save areas being previously created in accordance with a number of the one or more user processes;

process save information updating means for setting, at switching of the one or more user processes, a restart flag for the copied process information to designate whether the one or more user processes is to be restarted or not, while updating the process information saved in the one or more save areas to the latest state if the one or more user processes are not to be restarted;

process information save area releasing means for nullifying the copied process information, at termination of the one or more user processes;

main memory initialization means for initializing, at restart of the OS loaded on a main memory area of the main memory device, the main memory area of the main memory device used by the OS while not restarting the one or more save areas used by the one or more user processes for which the restart flag is set not to restart; and process restoration means for restoring, after completion of the restart of the OS, the copied process information of the one or more user processes for which the restart flag is set not to restart, from the one or more save areas to the restarted OS loaded on the main memory area.

20. The information processing apparatus according to claim 19, further comprising means for searching, when a restart flag is set for process information relating to a certain user process to designate whether the process is to be restarted or not, all the user processes belonging to the user application program as the user process, and setting restart flags in the process information relating to all the searched user processes to the same value.

21. A non-transitory computer-readable recording medium having recorded thereon a program for causing a computer to function as:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, and the one or more save areas being previously created in accordance with a number of the one or more user processes;

main memory initialization means for initializing, at the restart of the OS, the main memory area of the main memory device used by the OS while not initializing the one or more save areas used by the one or more user processes; and process restoration means for restoring the copied process information from the one or more save areas to the restarted OS loaded on the main memory area after completion of the restart of the OS.

22. The non-transitory computer-readable recording medium according to claim 21, wherein the program causes the computer to further function as means for starting up the OS from an OS main memory image stored in a nonvolatile storage portion forming a part of the main memory device.

23. The non-transitory computer-readable recording medium according to claim 22, wherein the program causes the computer to further function as means for copying, at every occurrence of a write access from the OS to the nonvolatile storage portion during system operation, data in an address range having a predetermined width including the address at which the write access has occurred from the nonvolatile storage portion to a substitute area ensured in a readable/writable main memory portion forming part of the main memory device, and for converting subsequent accesses to the address range having the predetermined width to accesses to the substitute area.

24. A non-transitory computer-readable recording medium having recorded thereon a program for causing a computer to function as:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, the one or more save areas being previously created in accordance with a number of the one or more user processes;

restart flag setting means for setting a restart flag for the saved process information to designate whether the one or more user processes are to be restarted or not;

main memory initialization means for initializing, at the restart of the OS, the main memory area of the main memory device used by the OS while not initializing the one or more save areas used by the one or more user processes for which the restart flag is set not to restart; and process restoration means for restoring, after completion of the restart of the OS, the copied process information of the one or more user processes for which the restart flag is set not to restart from the one or more save areas to the restarted OS loaded on the main memory area.

25. The non-transitory computer-readable recording medium according to claim 24, wherein the program causes the computer to further function as means for searching, when a restart flag is set for process information relating to a certain user process to designate whether the process is to be restarted or not, all the user processes belonging to the same user application program as the user process, and setting restart flags in the process information relating to all the searched user processes to the same value.

26. A non-transitory computer-readable recording medium having recorded thereon a program for causing a computer to function as:

process information saving means for copying, before restart of an OS loaded on a main memory area of a main memory device, process information to one or more save areas on the main memory device, the OS generating the process information that comprises a process condition of one or more user processes in accordance with execution of the one or more user processes to manage the one or more user processes, the one or more save areas being previously created in accordance with a number of the one or more user processes;

main memory initialization means for initializing, at the restart of the OS, the main memory area of the main memory device used by the OS while not restarting the one or more save areas used by the one or more user processes; and process restoration means for restoring, after completion of the restart of the OS, the copied process information from the one or more save areas to the restarted OS loaded on the main memory area.

27. The non-transitory computer-readable recording medium according to claim 26, wherein, before the restart of the OS, the process information saving means saves process information in the OS relating to a user process to be continuously operated after restart of the OS, to the one or more save areas on the main memory device, by referring to a process ID table storing identifiers of processes to be continuously operated or of processes not to be continuously operated.

28. A non-transitory computer-readable recording medium having recorded thereon a program for causing a computer to function as:

process save area generating means for copying, at generation of one or more user processes, process information to one or more save areas on a main memory device, the OS generating the process information that comprises a process condition of one or more user processes in accordance with execution of the one or more user processes to manage the one or more user processes, and the one or more save areas being previously created in accordance with a number of the one or more user processes;

process save information updating means for setting, at switching of the one or more user processes, a restart flag for the copied process information to designate whether the one or more user processes is to be restarted or not, while updating the process information saved in the one or more save areas to the latest state if the process is not to be restarted;

process information save area releasing means for nullifying the copied process information, at termination of the one or more user processes;

main memory initialization means for initializing, at restart of the OS loaded on a main memory area of the main memory device, the main memory area of the main memory device used by the OS while not restarting the one or more save areas used by the one or more user processes for which the restart flag is set not to restart; and process restoration means for restoring, after completion of the restart of the OS, the copied process information of the one or more user processes for which the restart flag is set not to restart from the one or more save areas to the restarted OS loaded on the main memory area.

29. The non-transitory computer-readable recording medium according to claim 28, wherein the program causes the computer to further function as means for searching all the user processes belonging to the user application program as the user process, when a restart flag is set for process information relating to a certain user process to designate whether the process is to be restarted or not, and setting restart flags in the process information relating to all the searched user processes to the same value.

30. A method for restarting an OS in a computer in which a first OS memory area for loading an OS and a process memory area for loading processes are allocated on a main memory, and the OS and the processes are loaded in the respective areas, the OS restart method comprising:

a first step of acquiring process information, that is information for the OS to manage the processes, from the first OS memory area and copying the same in one or more save areas provided in a predetermined storage device, the OS generating the process information that comprises a process condition of one or more user processes in accordance with execution of the one or more user processes to manage the one or more user processes, and the one or more save areas being previously created in accordance with a number of the one or more user processes;

a second step of initializing the first OS memory area while holding the process memory area;

a third step of allocating a second OS memory area on the main memory and loading the OS therein; and a fourth step of updating the process information in the OS memory area according to the process information copied in the first step.

31. The OS restart method according to claim 30, further comprising the steps of:
    selecting a process to be held from the processes loaded in the process memory area; and
    initializing the process memory area allocated to the processes not selected.

32. The OS restart method according to claim 30, wherein the one or more save areas is provided on the main memory.

33. The OS restart method according to claim 30, wherein information indicating whether each of the processes is to be restarted or not is stored in the one or more save areas together with the process information of the relevant process.

34. The OS restart method according to claim 30, wherein information indicating whether each of the processes is to be restarted or not is stored in a separate storage device from the storage device having the one or more save areas provided therein.

35. The OS restart method according to claim 30, wherein processing to generate, update and release the one or more save areas are executed in accordance with the generation, switching and termination of a process on the storage device having the one or more save areas provided therein.

36. In the OS restart method according to claim 30, a method for preliminarily preparing a nonvolatile storage device storing an image of the OS when it is loaded in the main memory, the third step referring to the image stored in the nonvolatile storage device to load the OS in the main memory.

37. The OS restart method according to claim 30, further comprising the steps of:
    loading a process including a plurality of processes associated with one application program in the process memory area;
    selecting a process to be held from among the processes loaded in the process memory area; and
    initializing the process memory area allocated to the processes other than the selected process and the other processes associated with the same application program as the selected process.

* * * * *